United States Patent
Yoneyama et al.

(10) Patent No.: US 10,279,758 B2
(45) Date of Patent: May 7, 2019

(54) POWER SUPPLY SYSTEM

(71) Applicant: TOYOTA JIDOSHA KABUSHIKI KAISHA, Toyota-shi, Aichi-ken (JP)

(72) Inventors: Isao Yoneyama, Toyota (JP); Tomohiro Usami, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 113 days.

(21) Appl. No.: 15/403,526

(22) Filed: Jan. 11, 2017

(65) Prior Publication Data

US 2017/0197565 A1    Jul. 13, 2017

(30) Foreign Application Priority Data

Jan. 13, 2016   (JP) ................................ 2016-004771

(51) Int. Cl.
| | | |
|---|---|---|
| *B60R 16/03* | (2006.01) | |
| *B60R 21/017* | (2006.01) | |
| *B60R 16/023* | (2006.01) | |
| *B60R 16/033* | (2006.01) | |
| *H02M 3/04* | (2006.01) | |
| *H02M 7/04* | (2006.01) | |
| *H02J 7/14* | (2006.01) | |

(52) U.S. Cl.
CPC ...... *B60R 16/0238* (2013.01); *B60R 16/0231* (2013.01); *B60R 16/03* (2013.01); *B60R 16/033* (2013.01); *B60R 21/017* (2013.01); *H02J 7/1423* (2013.01); *H02M 3/04* (2013.01); *H02M 7/04* (2013.01); *Y02T 10/7005* (2013.01)

(58) Field of Classification Search
CPC . B60R 16/0231; B60R 16/0238; B60R 16/03; B60R 16/033; B60R 21/017; H02J 7/1423; H02M 3/04; H02M 7/04
See application file for complete search history.

(56) References Cited

U.S. PATENT DOCUMENTS

2006/0145536 A1    7/2006   Hackl et al.

FOREIGN PATENT DOCUMENTS

| EP | 1595748 A1 | 11/2005 |
|---|---|---|
| JP | 2004-229478 A | 8/2004 |
| JP | 2006-321322 A | 11/2006 |
| JP | 2007-161000 A | 6/2007 |
| JP | 2009-120097 A | 6/2009 |

(Continued)

OTHER PUBLICATIONS

Translation of JP 2011/087408 & JP 2013158134.*

*Primary Examiner* — Hal Kaplan
*Assistant Examiner* — Elim Ortiz
(74) *Attorney, Agent, or Firm* — Hunton Andrews Kurth LLP

(57) ABSTRACT

A power source system includes: a main-power source; a first load connected in parallel to the main-power source; a second load connected in parallel to the main-power source, the second load being higher in an actuation priority than the first load; a sub-power source connected in parallel to the first load and the second load; a first detection unit configured to detect output electric power of the main-power source; and a control unit configured to supply electric power from the sub-power source more to the second load than to the first load, when the output electric power of the main-power source is less than required electric power of the second load.

7 Claims, 13 Drawing Sheets

(56) References Cited

FOREIGN PATENT DOCUMENTS

| JP | 2011-087408 A | | 4/2011 |
|---|---|---|---|
| JP | 2011087408 A | * | 4/2011 |
| JP | 2013-158134 A | | 8/2013 |
| JP | 2013158134 A | * | 8/2013 |
| JP | 2014-151873 A | | 8/2014 |
| WO | 2004/042888 A1 | | 5/2004 |
| WO | 2004/070911 A1 | | 8/2004 |
| WO | 2006/082125 A1 | | 8/2006 |

* cited by examiner

POWER SUPPLY SYSTEM

INCORPORATION BY REFERENCE

The disclosure of Japanese Patent Application No. 2016-004771 filed on Jan. 13, 2016 including the specification, drawings and abstract is incorporated herein by reference in its entirety.

BACKGROUND

1. Field of the Disclosure

The present disclosure relates to a power source system including a main-power source and a sub-power source that supply electric power used to actuate auxiliary machine loads.

2. Description of Related Art

There has been known a technology for power supply in an in-vehicle power source system having a main-power source, a sub-power source, and auxiliary machine loads connected in parallel. In the technology, when output power of the main-power source drops, electric power of the sub-power source is supplied to the auxiliary machine loads through a DC-DC converter (for example, Japanese Patent Application Publication No. 2006-321322).

SUMMARY

Some of the auxiliary machine loads have high necessity of being actuated in priority to other loads (high actuation priority). For example, electrical control units (ECUs) in control systems relating to traveling and stop of a vehicle (such as an anti-lock braking system (ABS), a vehicle stability control (VSC), a shift by wire (SBW), an electrical parking brake (EPB), an electrical power steering (EPS), a pre-crash safety (PCS), an adaptive cruise control (ACC), and an active speed limiter (ASL)), and actuators actuated with such control systems have a higher actuation priority than other component members from the viewpoint of safety. In the case where the vehicle is configured to make an emergency call to a communicative center outside the vehicle through a network such as a mobile phone network at the time of emergencies (such as collision of the vehicle), a component member such as a communication module for making an emergency call to the center is higher in the actuation priority than other component members from the viewpoint of user protection at the time of emergencies. Moreover, an ECU (body ECU) and an actuator such as a door lock motor that executes automatic door lock release control at the time of collision of the vehicle are higher in the actuation priority than other component members from the viewpoint of safety in order to automatically release the door lock to enable occupants to escape.

However, in the technology disclosed in JP 2006-321322 A, electric power of the sub-power source is uniformly supplied to all the auxiliary machine loads when the output electric power of the main-power source drops. Accordingly, there are possibilities that electric power is not sufficiently supplied to the auxiliary machine load high in the actuation priority, and therefore the auxiliary machine load high in the actuation priority may fail to perform appropriate operation. For example, assume the case where required power (required current) of an auxiliary machine load low in the actuation priority increases when the required power (required current) of the auxiliary machine load high in the actuation priority is large. In this case, the required power may fail to be supplied to the auxiliary machine load high in the actuation priority in the situation where the electric power of the sub-power source is uniformly supplied to all the auxiliary machine loads.

The present disclosure provides a power source system that supplies electric power from the sub-power source more to an auxiliary machine high in the actuation priority when output power from the main-power source drops.

An aspect of the present disclosure is a power source system, including: a main-power source; a first load connected in parallel to the main-power source; a second load connected in parallel to the main-power source, the second load being higher in an actuation priority than the first load; a sub-power source connected in parallel to the first load and the second load; a first detection unit configured to detect output electric power of the main-power source; and a control unit configured to supply electric power from the sub-power source more to the second load than to the first load, when the output electric power of the main-power source is less than required electric power of the first load and the second load.

According to the above aspect, when electric power outputtable from a main-power source of a vehicle drops, more electric power can be supplied from a sub-power source to a second load that is an auxiliary machine load high in an actuation priority. Accordingly, when the electric power outputtable from the main-power source drops, it becomes possible to reliably actuate the auxiliary machine load high in the actuation priority with electric power supply from the sub-power source.

The power source system according to the above aspect may further include a regulation unit disposed in a connection line between the sub-power source and the first load and the second load, the regulation unit being configured to regulate the electric power from the sub-power source, the electric power being supplied to a first line connected to the first load and to a second line connected to the second load; and a switch unit provided in the first line, the switch unit being configured to be able to switch whether or not to supply the electric power coming from the sub-power source via the regulation unit to the first load, wherein the control unit may be configured to control the regulation unit and the switch unit so that the electric power is supplied from the sub-power source more to the second load than to the first load, when the output electric power of the main-power source is less than the required electric power of the first load and the second load.

The power source system according to the above aspect may further include a second detection unit configured to detect power consumption of the first load, wherein the control unit may be configured to: control the regulation unit so that the electric power from the sub-power source is supplied to the first line and the second line while controlling the switch unit so that the electric power from the sub-power source is supplied to the first load via the regulation unit and the first line, when the output electric power of the main-power source is less than the required electric power of the first load and the second load and the electric power supplied from the sub-power source to the second load is more than the electric power supplied from the sub-power source to the first load; and control the regulation unit so that the electric power from the sub-power source is supplied to the first line and the second line while controlling the switch unit so that the electric power coming from the sub-power source via the regulation unit and the first line is not supplied to the first load, when the output electric power of the main-power source is less than the required electric power of the first load and the second load and the electric power supplied from the sub-power source to the second load is not more than the electric power supplied from the sub-power source to the first load.

According to the above aspect, in the situation where the second load does not receive more electric power when the electric power is supplied to both the first load and the second load from the sub-power, the electric power from the sub-power source is supplied only to the second load, so that more electric power may be supplied to the second load from the sub-power source. Therefore, in both the situation where more electric power is supplied to the second load and the situation where more electric power is not supplied to the second load when electric power is supplied to both the first load and the second load from the sub-power source upon drop of the electric power outputtable from main-power source, it becomes possible to supply more electric power from the sub-power source to the second load that is an auxiliary machine load high in the actuation priority.

In the above aspect, the control unit may be configured to control the regulation unit so that the electric power from the sub-power source is supplied to the first line and the second line while controlling the switch unit so that the electric power coming from the sub-power source via the regulation unit and the first line is not supplied to the first load, when the output electric power of the main-power source is less than the required electric power of the first load and the second load.

Therefore, according to the above aspect, when the electric power outputtable from the main-power source drops, the electric power from the sub-power source is not supplied to the first load but is intensively supplied to the second load high in the actuation priority. Accordingly, even more electric power can be supplied to the second load that is an auxiliary machine load high in the actuation priority. Therefore, it becomes possible to more reliably actuate the auxiliary machine load high in the actuation priority with electric power supply from sub-power source when the output of the main-power source drops.

In the above aspect, the regulation unit may include a DC-DC converter configured to regulate an output voltage so as to switch whether or not to supply the electric power from the sub-power source to the first line and the second line, and the control unit may be configured to control the output voltage of the DC-DC converter so that the output voltage of the DC-DC converter falls within a range of a required voltage of the second load, when the output electric power of the main-power source is less than the required electric power of the first load and the second load.

According to the above aspect, when the electric power outputtable from the main-power source drops, the electric power from the sub-power source is supplied to the second load within a range of a required voltage through a DC-DC converter. Therefore, it becomes possible to more reliably actuate the second load that is an auxiliary machine load high in the actuation priority.

In the above aspect, the regulation unit may include a relay configured to switch a disconnected state and a connected state so as to switch whether or not to supply the electric power from the sub-power source to the first line and the second line, and the control unit may be configured to control the relay to be in a connected state when the output electric power of the main-power source is less than the required electric power of the first load and the second load.

According to the above aspect, when the electric power outputtable from the main-power source drops, the electric power from the sub-power source is supplied to the second load through a relay in a connected state. That is, the electric power from the sub-power source is directly supplied to the second load without the use of a power converter such as the DC-DC converter. Accordingly, when the electric power is supplied to the second load from the sub-power source, a circuit loss due to the power converter and the like can be reduced, so that the electric power of the sub-power source may efficiently be used.

The power source system according to the above aspect may further include a third detection unit configured to detect remaining capacity of the sub-power source; and a fourth detection unit configured to detect current flowing to the sub-power source, wherein the regulation unit may include: a DC-DC converter configured to regulate an output voltage so as to switch whether or not to supply the electric power from the sub-power source to the first line and the second line; and a relay provided in a bypass route that bypasses the DC-DC converter to connect the first load and the second load to the sub-power source, and the control unit may be configured to: stop actuation of the DC-DC converter while controlling the relay to be in a connected state, when the output electric power of the main-power source is less than the required electric power of the first load and the second load and the remaining capacity is equal to or below a first threshold or change speed of the current is equal to or above a second threshold; and control a voltage of the DC-DC converter to fall within a range of a required voltage of the second load while controlling the relay to be in a disconnected state, when the output electric power of the main-power source is less than the required electric power of the first load and the second load and the remaining capacity is not equal to or below the first threshold and the change speed of the current is not equal to or above the second threshold.

According to the above aspect, when the electric power outputtable from the sub-power source drops, or when a required current value of the second load is large, the electric power of the sub-power source is supplied to the second load with the DC-DC converter being bypassed. Otherwise, the electric power coming from the sub-power source via the DC-DC converter is supplied to the second load within the range of the required voltage of the second load. Accordingly, when the electric power outputtable from the sub-power source drops, bypassing the DC-DC converter may reduce the circuit loss and may further lengthen a period of time in which the electric power can be supplied from the sub-power source to the second load. When the required current value of the second load is large, the system may fail to follow up a current change if the DC-DC converter is used. By bypassing the DC-DC converter, the capability of following up the required current value of the second load can be secured. On the contrary, when the electric power outputtable from the sub-power source does not drop and the required current value of the second load is not large either, the electric power coming from the sub-power source via the DC-DC converter is supplied to the second load within the range of the required voltage. Accordingly, it becomes possible to more reliably actuate the second load that is an auxiliary machine load high in the actuation priority.

The power source system according to the above aspect may further include a fifth detection unit configured to detect the voltage of the sub-power source, wherein the regulation unit may include: a DC-DC converter configured to regulate an output voltage so as to switch whether or not to supply the electric power from the sub-power source to the first line and the second line; and a relay provided in a bypass route that bypasses the DC-DC converter to connect the first load and the second load to the sub-power source, and the control unit may be configured to stop actuation of the DC-DC converter and controls the relay to be in a connected state when the output electric power of the main-power source is less than the required electric power of the first load and the second load, and then when the voltage of the sub-power source becomes less than a range of a required voltage of the second load, the control unit may be configured to control the relay to be in a disconnected state.

According to the above aspect, when the output electric power of the main-power source drops, the DC-DC converter may be bypassed so as to supply the electric power of the sub-power source to the second load. Accordingly, it becomes possible to reduce the circuit loss and to further lengthen a period of time in which the electric power can be supplied from the sub-power source to the second load. When the required current value of the second load is large, the system may fail to follow up the current change if the DC-DC converter is used. By bypassing the DC-DC converter, the capability of following up the required current value of the second load can be secured. If the voltage of the sub-power source becomes lower than the range of the required voltage of the second load afterward, electric power supply from the sub-power source to the second load is cut off. Accordingly, it becomes possible to suppress failure such as malfunction of the second load attributed to supply of electric power out of the range of the required voltage.

The present mode can provide an in-vehicle power source system capable of supplying electric power from the sub-power source more to an auxiliary machine load high in an actuation priority when output electric power from the main-power source drops.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a description will be given with reference to the drawings.

First, the configuration of a power source system 1 is described with reference to FIGS. 1 and 2.

Figure 1:
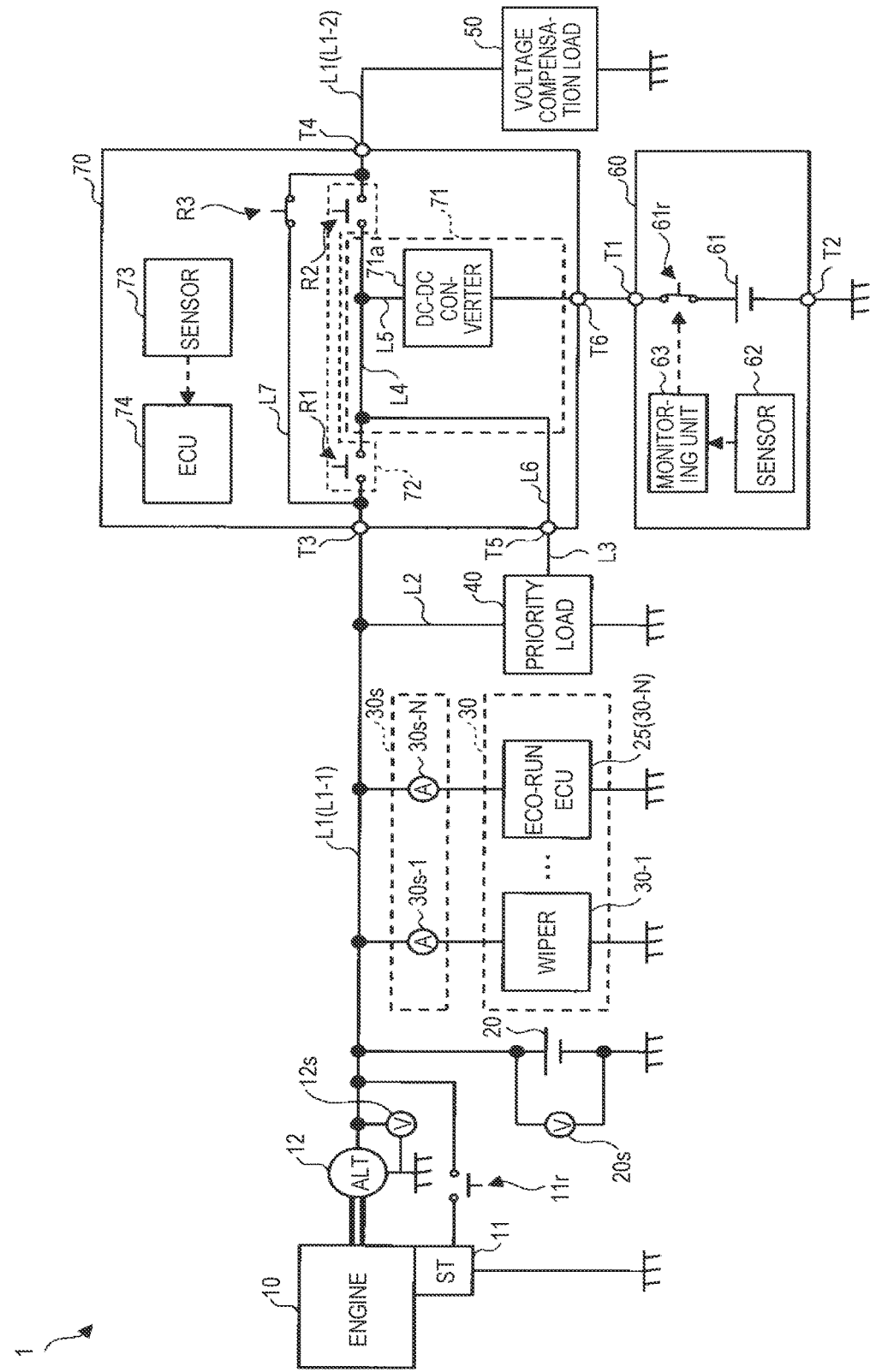
FIG. 1 is a configuration diagram illustrating one example of the configuration of a power supply system of a power source system according to a first embodiment.

FIG. 1 is a configuration diagram illustrating one example of the configuration of a power supply system of the power source system 1 according to the present embodiment. FIG. 2 is a block diagram illustrating one example of the configuration of a control system of the power source system 1 according to the present embodiment.

Figure 2:
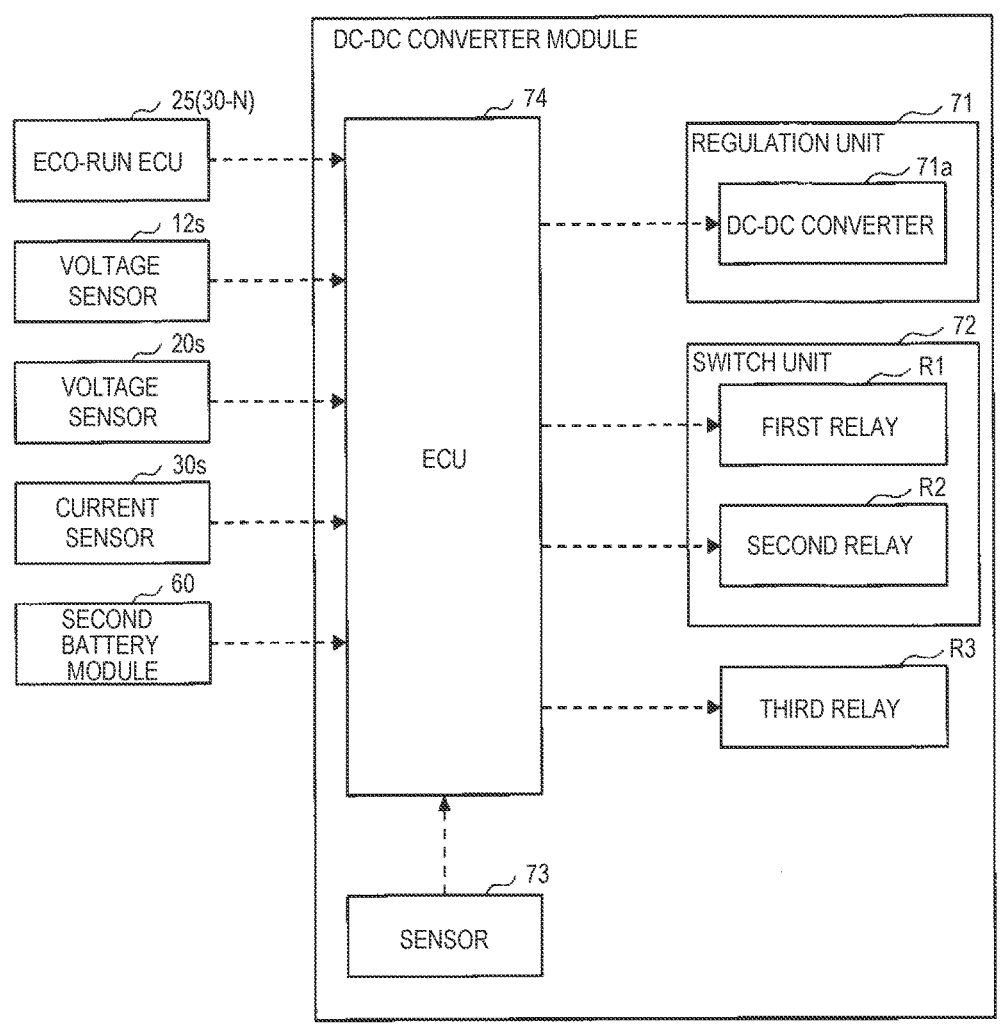
FIG. 2 is a block diagram illustrating one example of the configuration of a control system of the power source system according to the first embodiment.

In FIGS. 1 and 2, a double line represents a power transmission system, a solid line represents an electric power transmission system, and a dotted arrow line represents a control command and signal transmission system.

The power source system 1 is incorporated in a vehicle having an engine 10 as a driving force source. The power source system 1 includes a starter 11, an alternator 12, a main battery 20, a voltage sensor 20s, an eco-run ECU 25, a normal load 30, a current sensor 30s, a priority load 40, a voltage compensation load 50, a sub-battery module 60, and a DC-DC converter module 70. Hereinafter, a term "vehicle" refers to a vehicle that incorporates the power source system 1 unless otherwise specified.

The starter 11 is a known start means for cranking and starting the engine 10 with electric power supplied from the main battery 20. For example, when an ignition switch (IG switch) is turned on in response to prescribed operation of a user, a starter relay 11r provided in a connection line between the main battery 20 and the starter 11 is turned on, so that the electric power from the main battery 20 is supplied to the starter 11. As a consequence, the engine 10 is cranked, and at the same time, in response to a command from an engine ECU (not illustrated), operation such as injection and ignition of fuel is properly performed inside a cylinder of the engine 10, so that the engine 10 is started.

The alternator 12, which is a DC generator driven with motive power of the engine 10, is constituted of an AC generator, a rectifier that converts three-phase AC electric power generated by the AC generator into DC electric power, and the like. The alternator 12 can generate electric power with the motive power of the engine 10, the motive power being transmitted from a crankshaft of the engine 10 through a belt. The alternator 12 includes a regulator, and the regulator can control a power generation voltage of the alternator 12 by controlling power generation control current (field current flowing into a rotor coil of the alternator 12). By controlling the power generation voltage of the alternator 12, the amount of electric power generation can be regulated. The electric power generated by the alternator 12 is used to charge the main battery 20 and the sub-battery 61 (described later) or is supplied as drive electric power to the auxiliary machine loads (the normal load 30, the priority load 40, and the voltage compensation load 50) and the like.

The voltage sensor 12s is a known voltage detection means for detecting a voltage Valt between terminals of the alternator 12. As illustrated in FIG. 2, the voltage Valt of the alternator 12 detected by the voltage sensor 12s is transmitted to the DC-DC converter module 70 (an ECU 74 described later) through an in-vehicle network, such as a one-to-one communication line and a controller area network (CAN).

The main battery 20 is a main-power source connected in parallel with the normal load 30, the priority load 40, and the voltage compensation load 50 that are auxiliary machine loads so as to supply electric power to the loads. The main battery 20 is a secondary battery, such as a lead battery, a nickel hydrogen battery, and a lithium-ion battery, with a rated voltage of 12V. The main battery 20 can supply a voltage of about 12V to 15V, depending on a charged state, to the component members such as the starter 11, the normal load 30, the priority load 40, and the voltage compensation load 50. The main battery 20 is also connected in parallel with the alternator 12 so as to be charged with the generated electric power supplied from the alternator 12.

The voltage sensor 20s (one example of a first detection unit configured to detect electric power (output electric power) outputtable by the main battery 20) is a known voltage detection means for detecting a voltage V1 between terminals of the main battery 20. As illustrated in FIG. 2, the voltage V1 of the main battery 20 detected by the voltage sensor 20s is transmitted to the DC-DC converter module 70 (the ECU 74) through a one-to-one communication line or an in-vehicle network (such as a CAN).

The eco-run ECU 25 is an electronic control unit that executes eco-run control (idling stop control) that executes automatic stop and automatic start of the engine 10. The eco-run ECU 25, which is constituted of a microcomputer and the like for example, can implement various control processing by executing various programs stored in a ROM on a CPU.

When engine stop conditions prescribed in advance are satisfied, the eco-run ECU 25 outputs a request (engine stop request) for automatically stopping the engine 10 to the engine ECU (not illustrated). Accordingly, in response to the engine stop request, the engine ECU cuts off fuel supply to the engine 10 at specified timing to stop the engine 10. The engine stop conditions includes, for example, the speed of the vehicle being equal to or below a predetermined speed (such as 8 km/h, and 0-km/h corresponding to vehicle stop), a brake pedal being stepped to a specified level or more (a master cylinder pressure being a first predetermined value or more), the voltage V1 of the main battery 20 being a predetermined first voltage or more. When all of the plurality of engine stop conditions are satisfied, the engine is stopped.

The eco-run ECU 25 outputs a request for automatically starting the engine 10 (engine start request) to the engine ECU, if the engine start conditions prescribed in advance are satisfied after the engine stop request is output. As a consequence, the engine ECU turns on the starter relay 11r to drive the starter 11, and also causes proper execution of operation, such as injection and ignition of fuel in the cylinder of the engine 10, so that the engine 10 is started. The engine start conditions includes, for example, stepping of the brake pedal being canceled (the master cylinder pressure becoming equal to or below a second predetermined value that is lower than the first predetermined value), the voltage V1 of the main battery 20 becoming equal to or below a specified second voltage that is lower than the first voltage. When any one of the plurality of engine start conditions is satisfied, the engine is started.

The eco-run ECU 25 outputs the engine stop request and the engine start request to the engine ECU through the in-vehicle network (such as the CAN). Accordingly, as illustrated in FIG. 2, the DC-DC converter module 70 connected to the in-vehicle network can receive the engine stop request and the engine start request output from the eco-run ECU 25.

The normal load 30, the priority load 40, and the voltage compensation load 50 are each auxiliary machine loads connected in parallel with the main battery 20 and actuated with the electric power supplied from the main battery 20.

For example, the normal load 30 (examples of the first load) is a load such as a wiper (a normal load 30-1 in FIG. 1), an air-conditioner, and lighting appliances mounted in the vehicle. The normal load 30 includes N normal loads 30-1 to 30-N (N is an integer of one or more). As illustrated in FIG. 1, the eco-run ECU 25 is included in the normal load 30 in the present embodiment (the normal load 30-N).

The priority load 40 (one example of the second load) is an auxiliary machine load having high necessity of being actuated (having high actuation priority) in priority to the normal load 30 and the voltage compensation load 50. For example, the priority load 40 includes various ECUs in the control systems relating to traveling and stop of the vehicle (such as ABS, VSC, SBW, EPB, EPS, PCS, ACC, and ASL), and actuators actuated by the control systems. Various ECUs and the actuators in such control systems are high in the actuation priority from the viewpoint of safety in order to appropriately implement traveling and stop of the vehicle. The priority load 40 also includes various occupant protection devices (such as seatbelt pretensioners, active headrests, and various airbags) and ECUs that actuate the occupant protection devices at the time of collision of the vehicle. The various occupant protection devices and the ECUs that actuate the occupant protection devices are high in the actuation priority from the viewpoint of safety as they reduce the impact on the occupant at the time of collision of the vehicle. The priority load 40 also includes various pedestrian protection devices (such as a pop-up hood and a bonnet airbag) and ECUs that actuate the pedestrian protection devices at the time of collision of the vehicle. For example, when the vehicle is configured to make an emergency call to an outside center and the like through a network such as a mobile phone network at the time of emergencies (such as at the time of collision of the vehicle), the priority load 40 also includes a communication module and the like for making an emergency call to such a center. Such communication module and the like are high in the actuation priority from the viewpoint of user protection at the time of emergencies. The priority load 40 also includes an ECU (a body ECU) that executes control to automatically unlock the doors at the time of collision of the vehicle and an actuator such as a door lock motor. Such ECU and actuator are high in the actuation priority from the viewpoint of safety so as to prevent the situation where occupants are unable to escape from a vehicle cabin at the time of collision of the vehicle due to the vehicle being deformed with the doors being locked.

The voltage compensation load 50 (one example of the first load) is an auxiliary machine load that needs voltage compensation for voltage drop of the main battery 20 at automatic start of the engine 10 by the eco-run ECU 25. For example, the voltage compensation load 50 includes devices such as a navigation device and an audio device that are subjected to system reset due to voltage drop of the main battery 20.

The current sensor 30s (one example of the second detection unit configured to detect power consumption of the first load) is a known current detection means for detecting current flowing through the normal load 30. The current sensor 30s includes current sensors 30s-1 to 30s-N that detect current of the normal loads 30-1 to 30-N, respectively. As illustrated in FIG. 2, a current value I1 of the normal load 30 (30-1 to 30-N) detected by the current sensor 30s (30s-1 to 30s-N) is transmitted to the DC-DC converter module 70 (the ECU 74 described later) through the one-to-one communication line or the in-vehicle network (such as the CAN).

The sub-battery module 60 is connected in parallel with the component members such as the main battery 20, the normal load 30, the priority load 40, and the voltage compensation load 50 through the DC-DC converter module 70. The sub-battery module 60 has a terminal T1 on a high-pressure side and a terminal T2 on a low-pressure side, the terminal T1 being connected with the DC-DC converter module 70 (a terminal T6 described later), while the terminal T2 being grounded. The sub-battery module 60 includes a sub-battery 61, a guard relay 61r, a sensor 62, and a monitoring unit 63.

The sub-battery 61 is provided in a connection line between the terminal T1 and the terminal T2 so that a positive electrode terminal is on the terminal T1 side. That is, the sub-battery 61 is connected in parallel with the normal load 30, the priority load 40, and the voltage compensation load 50 through the DC-DC converter module 70 (a regulation unit 71 described later) so that electric power can be supplied to the loads. For example, the sub-battery 61 is a secondary battery, such as a nickel hydrogen battery and a lithium-ion battery, with a rated voltage of 12V. The sub-battery 61 supplies a voltage of about 12 v to 15V, depending on a charged state, to the DC-DC converter module 70 (the regulation unit 71). The sub-battery 61 is also connected in parallel with the alternator 12, so that the sub-battery 61 can be charged with the electric power generated and supplied from the alternator 12 through the DC-DC converter module 70 (the regulation unit 71).

The guard relay 61r is a normally-closed type relay provided between the terminal T1 and (a positive electrode terminal of) the sub-battery 61. The guard relay 61r is normally in a closed state (ON state). In response to a disconnect command (described later) from the monitoring unit 63, the guard relay 61r is switched to an opened state (OFF state) to cut off electric power supply from the sub-battery 61 to the downstream side (the terminal T1 side in a direction of a flow of current when the current is discharged from the sub-battery 61).

The sensor 62 detects various states of the sub-battery 61. For example, the sensor 62 includes a voltage sensor that detects a voltage V2 of the sub-battery 61 (examples of a third detection unit that detects remaining capacity of the sub-battery 61 and a fifth detection unit that detects the voltage V2 of the sub-battery 61), a current sensor that detects current (one example of a fourth detection unit that detects current flowing through the sub-battery 61), and a temperature sensor that detects temperature. Detection signals of the sensor 62 are output to the monitoring unit 63. The detection signals of the sensor 62 are transmitted to the DC-DC converter module 70 (the ECU 74 described later) through the one-to-one communication line or the in-vehicle network (such as the CAN) with use of a communication function included in the sub-battery module 60.

The monitoring unit 63 monitors the presence of abnormal states (such as an overdischarging state, an overcurrent state, and an overheating) of the sub-battery 61 based on the detection signals received from the sensor 62. For example, the monitoring unit 63 determines the presence of the overdischarging state based on the voltage V2 of the sub-battery 61 received from the sensor 62. The monitoring unit 63 also determines the presence of the overcurrent state based on the current I2 of the sub-battery 61 received from the sensor 62. The monitoring unit 63 also determines the presence of the overheating state based on temperature TP2 of the sub-battery 61 received from the sensor 62. When determining that the sub-battery 61 is in an abnormal state (such as the overdischarging state, the overcurrent state, and the overheating state), the monitoring unit 63 outputs a disconnect command to the guard relay 61r to cut off electric power supply from the sub-battery 61 to the downstream side. The monitoring unit 63, which is constituted of a microcomputer and the like for example, can implement the control processing by executing various programs stored in the ROM on the CPU.

The DC-DC converter module 70 is provided on a line L1 of on the high-pressure side that supplies electric power from the alternator 12 or the main battery 20 to the auxiliary machine loads (the normal load 30, the priority load 40, and the voltage compensation load 50). As viewed from the alternator 12 and the main battery 20, the DC-DC converter module 70 is disposed on a portion of the line L1 downstream from connection locations of the normal load 30 and the priority load 40, the portion being upstream from the connection location of the voltage compensation load 50. The DC-DC converter module 70 has terminals T3 and T4, the terminal T3 being connected to a line L1-1 which is connected to the normal load 30 and the priority load 40 in the line L1, while the terminal T4 being connected to a line L1-2 which is connected to the voltage compensation load 50. The DC-DC converter module 70 has a terminal T5, the terminal T5 being connected with the priority load 40 (line L3) without crossing a line L2 that connects the priority load 40 to the line L1 (L1-1). The DC-DC converter module 70 also has a terminal T6, the terminal T6 being connected to the terminal T1 of the sub-battery module 60, i.e., (the positive electrode terminal of) the sub-battery 61 through the guard relay 61r. The DC-DC converter module 70 includes: the regulation unit 71 including the DC-DC converter 71a; a switch unit 72 including a first relay R1 and a second relay R2; a third relay R3; a sensor 73; and an ECU 74.

The regulation unit 71 is provided in a connection line between the sub-battery 61 and the auxiliary machine loads (the normal load 30, the priority load 40, the voltage compensation load 50). The regulation unit 71 has a function of regulating the electric power from the sub-battery 61 to be supplied downstream (a line L4 between the terminal T3 and the terminal T4 connected to the auxiliary machine loads to be specific) that is in a direction of current flow when the current is discharged from the sub-battery 61. Regulation of electric power performed by the regulation unit 71 includes switching whether or not to supply the electric power from the sub-battery 61 to the downstream side (ON-OFF switching of electric power supply from the sub-battery 61 to the downstream side).

The DC-DC converter 71a is provided in a line L5 that connects a midpoint of the line L4 and the terminal T6, the line L4 extending between the terminal T3 and the terminal T4. That is, the DC-DC converter 71a is connected to (the positive electrode terminal of) the sub-battery 61 through the terminals T6, T1, so that the voltage V2 of the sub-battery 61 can be regulated and output downstream (line L4). That is, the DC-DC converter 71*a* can switch whether or not to supply the electric power from the sub-battery 61 to the downstream side (line L4) by regulating the output voltage. Specifically, when the later-described first relay R1 is in a closed state (ON state), the output voltage of the DC-DC converter 71*a* may be regulated to be lower than the voltage Valt of the alternator 12 or the voltage V1 of the main battery 20. As a consequence, the DC-DC converter 71*a* can prevent the electric power from the sub-battery 61 from being supplied to the line L4 connected to the line L1 (L1-1 and L1-2) through the terminals T3, T4. When the output voltage of the DC-DC converter 71*a* is regulated to be higher to some extent than the voltage Valt of the alternator 12 or the voltage V1 of the main battery 20, the DC-DC converter 71*a* can supply the electric power from the sub-battery 61 to the downstream line L4. In this case, if the magnitude of the output voltage of the DC-DC converter 71*a* is regulated, an electric power amount supplied to the downstream (auxiliary machine loads) side from the sub-battery 61 can be regulated.

The switch unit 72 is provided in the connection line (the first line) connecting the regulation unit 71 to the normal load 30 and the voltage compensation load 50 among the auxiliary machine loads (the normal load 30, the priority load 40, the voltage compensation load 50). The switch unit 72 has a function of switching whether or not to supply the electric power coming from the sub-battery 61 via the regulation unit 71 to the normal load 30 and the voltage compensation load 50.

The first relay R1 is provided in a portion of the line L4 closer to the terminal T3 side than to a connection point with the line L5. That is, the first relay R1 is provided between the DC-DC converter 71*a* and the normal load 30, among the auxiliary machine loads (the normal load 30, the priority load 40, the voltage compensation load 50) (provided in the line connecting the regulation unit 71 and the normal load 30). The first relay R1 supplies the electric power coming from the sub-battery 61 via the regulation unit 71 (the DC-DC converter 71*a*) to the normal load 30 when the first relay R1 is in the closed state (ON state). On the contrary, the first relay R1 does not supply the electric power coming from the sub-battery 61 via the regulation unit 71 (the DC-DC converter 71*a*) to the normal load 30 when the first relay R1 is in the opened state (OFF state). That is, the first relay R1 switches whether or not to supply the electric power coming from the sub-battery 61 via the regulation unit 71 (the DC-DC converter 71*a*) to the normal load 30.

A line L6 is provided to connect the terminal T5 to a midpoint between the first relay R1 and a connection point connecting the line L4 and the line L5. Accordingly, the electric power supplied from the sub-battery 61 through DC-DC converter 71*a* to the line L4 is supplied to the priority load 40 not through a line passing the first relay R1, the terminal T3, the line L1-1 and the line L2 but through a line (second line) passing the line L6, the terminal T5, and the line L3. The priority load 40 is also connected to the line L1 (L1-1) through the line L2, and is also connected to the line L4 through the line L3, the terminal T3, and the line L6. Accordingly, when the first relay R1 is in a disconnected state, the priority load 40 can receive electric power supply from both the main battery 20 and the sub-battery 61 (the DC-DC converter 71*a*). Note that the line L2 that connects the priority load 40 with the line L1-1 may be omitted.

The second relay R2 is provided in a portion of the line L4 closer to the terminal T4 side than to a connection point with the line L5. That is, the second relay R2 is provided between the regulation unit 71 (the DC-DC converter 71*a*) and the voltage compensation load 50, among the auxiliary machine loads (the voltage compensation 30, the priority load 40, the voltage compensation load 50) (provided in the line connecting the regulation unit 71 and the voltage compensation load 50). The second relay R2 supplies the electric power coming from the sub-battery 61 via the regulation unit 71 (the DC-DC converter 71*a*) to the voltage compensation load 50 when the second relay R2 is in the closed state (ON state). On the contrary, the second relay R2 does not supply the electric power coming from the sub-battery 61 via the DC-DC converter 71*a* to the voltage compensation load 50 when the second relay R2 is in the opened state (OFF state). That is, the second relay R2 switches whether or not to supply the electric power coming from the sub-battery 61 via the regulation unit 71 (the DC-DC converter 71*a*) to the voltage compensation load 50.

The third relay R3 is provided in a line L7 that connects a midpoint between the terminal T3 and the first relays R1 on the line L4 and a midpoint between the second relay R2 and the terminal T4 on the line L4. That is, the third relay R3 is provided in the line L7 that bypasses the first relay R1, the second relay R2 and connects between the terminal T3 and the terminals T4. Accordingly, when the third relay R3 is put in the closed state (ON state), the electric power supplied from at least one of the alternator 12 and the main battery 20 to the terminal T3 via the line L1-1 can be supplied to the voltage compensation load 50 even in the case where at least one of the first relay R1 and the second relay R2 is in the opened state (OFF state).

The sensor 73 is a known voltage detection means for detecting a voltage (an input voltage Vdi) of an input terminal (a terminal connected with the sub-battery 61) of the DC-DC converter 71*a* and a voltage (an output voltage Vdo) of an output terminal (a terminal connected with the line L4) of the DC-DC converter 71*a*. The detection signals indicative of the input voltage Vdi and the output voltage Vdo of the DC-DC converter 71*a* detected by the sensor 73 are transmitted to the ECU 74.

The input voltage Vdi of the DC-DC converter 71*a* corresponds to the voltage V2 of the sub-battery 61. That is, the sensor 73 is one example of the fifth detection unit that detects the voltage V2 of the sub-battery 61.

The ECU 74 (one example of the control unit) is an electronic control unit that controls the actuation state of the regulation unit 71 (the DC-DC converter 71*a*), the switch unit 72 (first relay R1, second relay R2), and the third relay R3. The ECU 74 controls the units to switch the presence of electric power supply to the auxiliary machine loads (normal load 30, priority load 40, and voltage compensation load 50) from the sub-battery 61. The ECU 74, which is constituted of a microcomputer and the like for example, can implement various control processing by executing various programs stored in the ROM on the CPU.

When controlling the output voltage of the DC-DC converter 71*a*, the ECU 74 generates PWM signals for respective switching elements that are component members of the DC-DC converter 71*a*, based on the input voltage Vdi and the output voltage Vdo of the DC-DC converter 71*a* detected by the sensor 73, so that the output voltage Vdo coincides with a set value Vdset. Then, the ECU 74 outputs such PWM signals to (each switching element of) the DC-DC converter 71*a*, which makes it possible to control the output voltage Vdo to coincide with the set value Vdset.

During a period from ignition-off (IG-OFF) to ignition-on (IG-ON) of the vehicle (during a period in which the vehicle is in a parking state), the sub-battery 61 supplies electric power to the auxiliary machine loads that are actuated (such as an ECU that executes control relating to a smart entry system, and control targets of such an ECU including a transmitter and a receiver). That is, during the period from IG-OFF to IG-ON of the vehicle, the ECU 74 sets the set value Vdset of the output voltage of the DC-DC converter 71a higher than the voltage V1 of the main battery 20 to control the auxiliary machine loads to be actuated with the electric power from the sub-battery 61. In such a case, the ECU 74 sets the first relay R1 in ON state, the second relay R2 in ON state (OFF state when no voltage compensation load 50 is present while the vehicle is in the parking state), and the third relay R3 in OFF state, respectively. Regardless of the presence of actuation of the auxiliary machine loads, the set value Vdset of the output voltage of the DC-DC converter 71a may be set higher than the voltage V1 of the main battery 20, so that the electric power of the sub-battery 61 is supplied to the main battery 20 to charge the main battery 20. As a result, it becomes possible to suppress occurrence of the situation where the main battery 20 runs out due to the dark current or the like and the engine 10 cannot be started.

Figure 3:
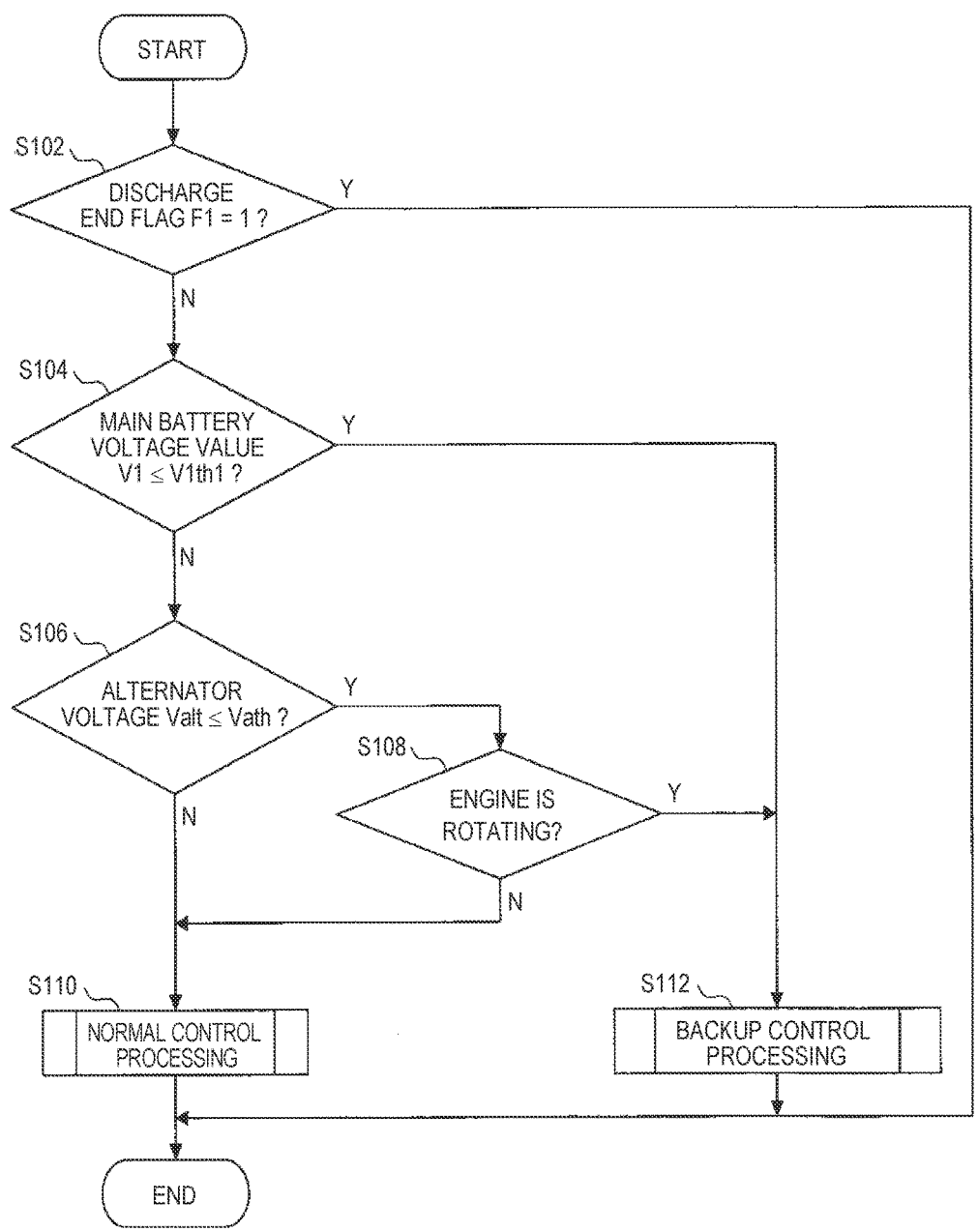
FIG. 3 is a main flowchart schematically illustrating one example of main processing by the power source system (ECU) according to the first embodiment.

A description is now given of the control processing (main processing) by the ECU 74 with reference to FIG. 3.

FIG. 3 is a main flowchart schematically illustrating one example of the main processing by the power source system 1 (the ECU 74) according to the present embodiment. The processing based on the main flowchart is repeatedly executed during a period after the end of initial processing after IG-ON until IG-OFF of the vehicle.

As an initial state after IG-ON, the first relay R1 is set in ON state, the second relay R2 is set in ON state, and the third relay R3 is set in OFF state, respectively. The set value Vdset of the output voltage of the DC-DC converter 71a is set to a predetermined value Vd0 that is lower than the voltage supplied from the alternator 12 or the main battery 20. That is, as the initial state, out of the main battery 20 and the sub-battery 61, the main battery 20 supplies electric power to the auxiliary machine loads (the normal load 30, the priority load 40, and the voltage compensation load 50), while the sub-battery 61 does not supply electric power. A discharge end flag F1 is a flag indicating difficulty in electric power supply from the sub-battery 61 to the auxiliary machine loads. When the flag is "0", it is indicated that electric power supply from the sub-battery 61 is possible, whereas when the flag is "1", it is indicated that electric power supply from the sub-battery 61 is difficult (end of discharge). The initial value of the discharge end flag F1 is "0."

In step S102, the ECU 74 determines whether or not the discharge end flag F1 is "1", i.e., whether or not electric power supply from the sub-battery 61 to the auxiliary machine loads is difficult. When the discharge end flag F1 is not "1" (but "0"), the ECU 74 advances the processing to step S104. Otherwise, the ECU 74 ends the processing of the current time.

In step S104, the ECU 74 determines whether or not the output electric power of the main battery 20 is less than required electric power of the auxiliary machine loads (the normal load 30, the priority load 40, and the voltage compensation load 50) (electric power required for actuating the auxiliary machine loads). Specifically, the ECU 74 determines whether or not the voltage V1 of the main battery 20 received from the voltage sensor 20s is equal to or below a predetermined threshold value V1$th$1. When the voltage V1 of the main battery 20 is not equal to or below the predetermined threshold value V1$th$1, the ECU 74 determines that the output electric power of the main battery 20 is not less than the required electric power of the auxiliary machine loads (the normal load 30, the priority load 40, and the voltage compensation load 50), and advances the processing to step S106. When the voltage V1 of the main battery 20 is equal to or below the predetermined threshold value V1$th$1, the ECU 74 determines that the output electric power of the main battery 20 is less than the required electric power of the auxiliary machine loads (the normal load 30, the priority load 40, and the voltage compensation load 50), and advances the processing to step S112.

The predetermined threshold value V1$th$ is prescribed in advance based on factors such as configurations and specifications of the normal load 30, the priority load 40, and the voltage compensation load 50.

In step S106, the ECU 74 determines whether or not the voltage Valt of the alternator 12 received from the voltage sensor 12s is equal to or below the predetermined threshold value Vath. The ECU 74 determines that the alternator 12 is normal when the voltage Valt of the alternator 12 is not equal to or below the predetermined threshold value Vath, and advances the processing to step S110. When the voltage Valt of the alternator 12 is equal to or below the predetermined threshold value Vath, the ECU 74 determines that the alternator 12 is possibly abnormal, and advances the processing to step S108.

The predetermined threshold value Vath is prescribed in advance based on factors such as the specification of the alternator 12.

In step S108, the ECU 74 determines whether or not the engine 10 is rotating. Specifically, the ECU 74 determines whether or not the engine 10 is in an automatic stop state based on the presence of output of an engine stop request from the eco-run ECU 25 and on the presence of output of an engine start request. When the engine 10 is in the automatic stop state, the engine 10 is not rotating, and so the ECU 74 determines that the alternator 12 is normal and advances the processing to step S110. When the engine 10 is not in the automatic stop state, the engine 10 is rotating and so the ECU 74 determines that the alternator 12 is abnormal and advances the processing to step S112.

The ECU 74 may determine whether or not the engine 10 is rotating based on a detection signal received from an engine speed sensor (such as a crank angle sensor and a cam angle sensor) which is not illustrated.

In step S110, the ECU 74 executes normal control processing that supplies electric power to the auxiliary machine loads (the normal load 30, the priority load 40, and the voltage compensation load 50) from the main battery 20 out of the main battery 20 and the sub-battery 61 except for some cases.

Meanwhile, in step S112, the ECU 74 executes backup control processing for supplying the electric power from the sub-battery 61 to the priority load 40.

Figure 4:
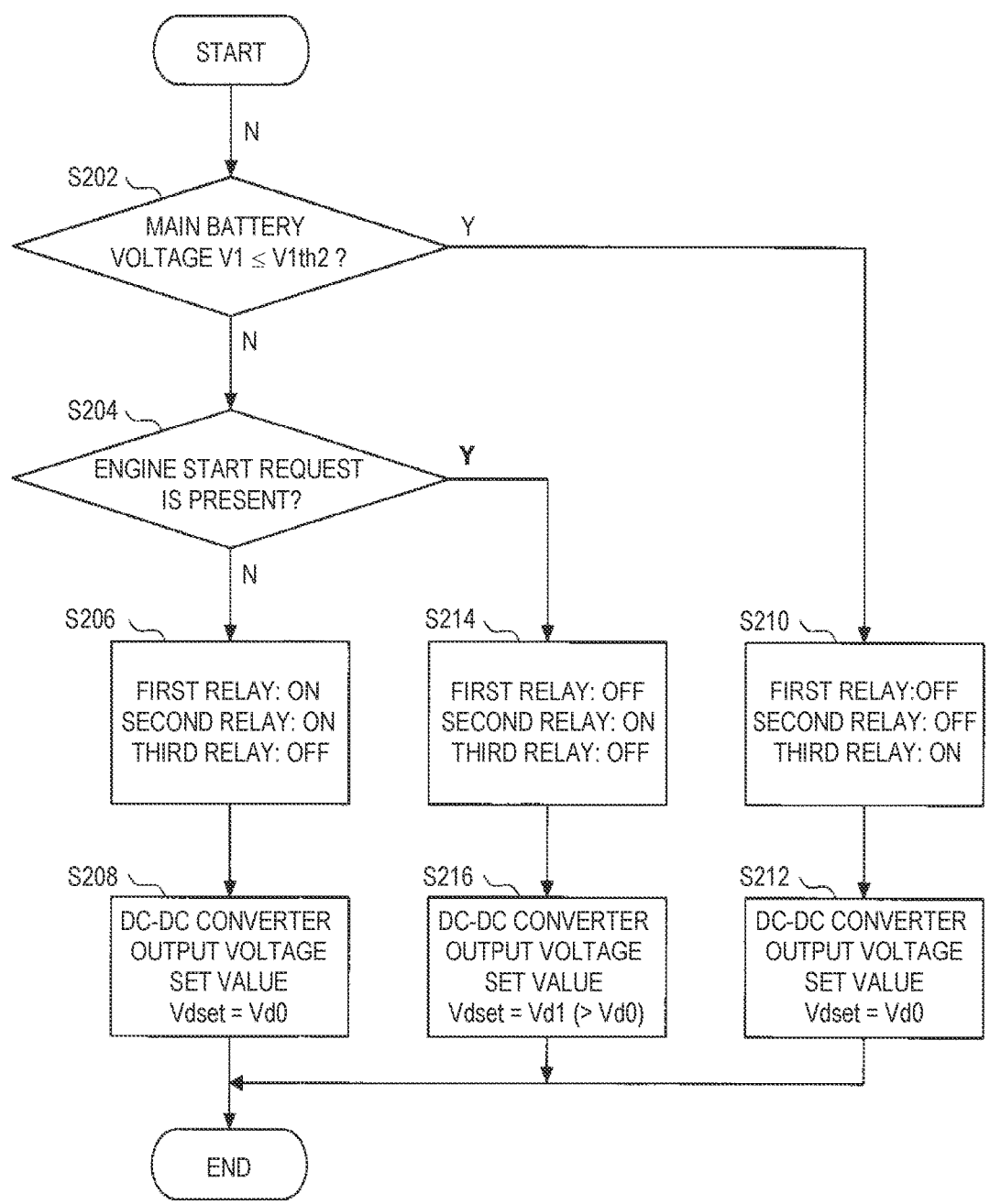
FIG. 4 is a sub-flowchart schematically illustrating one example of normal control processing by the power source system (ECU) according to the first embodiment.

A description is now given of the details of the normal control processing in step S110 of FIG. 3 with reference to FIG. 4.

FIG. 4 is a sub-flowchart schematically illustrating one example of the normal control processing by the power source system 1 (the ECU 74) according to the present embodiment.

In step S202, the ECU 74 determines whether or not the voltage V1 of the main battery 20 received from the voltage sensor 20s is equal to or below a predetermined threshold value V1*th*2 (>V1*th*1). When the voltage V1 of the main battery 20 is not equal to or below the predetermined threshold value V1*th*2, the ECU 74 determines that the charging state of the main battery 20 is relatively good, and advances the processing to step S204. When the voltage V1 of the main battery 20 is equal to or below the predetermined threshold value V1*th*2, the ECU 74 determines that the charging state of the main battery 20 is relatively worse, and advances the processing to step S210.

In step S204, the ECU 74 determines whether or not an engine start request is output from the eco-run ECU 25. When the engine start request is not output, the ECU 74 determines that the engine does not automatically start, and advances the processing to step S206. When the engine start request is output from the eco-run ECU 25, the ECU 74 determines that the engine 10 automatically starts and advances the processing to step S214.

In step S206, the ECU 74 sets the first relay R1 in ON state, the second relay R2 in ON state, and the third relay R3 in OFF state, respectively. In step S208, the ECU 74 sets the set value Vdset of the output voltage of the DC-DC converter 71*a* to a predetermined value Vd0. That is, when the charging state of the main battery 20 is relatively good and the engine 10 does not automatically start, the ECU 74 implements the control state same as the above-stated initial state for the first relay R1, the second relay R2, the third relay R3, and the DC-DC converter 71*a*. Accordingly, the main battery 20, out of the main battery 20 and the sub-battery 61, supplies electric power to the auxiliary machine loads (the normal load 30, the priority load 40, and the voltage compensation load 50), while the sub-battery 61 does not supply electric power.

When it is determined in step S202 that the voltage V1 of the main battery 20 is equal to or below the predetermined threshold value V1*th*2, then in step S210, the ECU 74 sets the first relay R1 in OFF state, the second relay R2 in OFF state, and the third relay R3 in ON state, respectively. Then in step S212, the ECU 74 sets the set value Vdset of the output voltage of the DC-DC converter 71*a* to the predetermined value Vd0. Accordingly, since the electric power generated by the alternator 12 (including electric power by regenerative deceleration) is not supplied to the sub-battery 61, but is intensively supplied to the main battery 20, the charging state of the main battery 20 can be restored earlier. Meanwhile, when the charging state of the main battery 20 is relatively good, the electric power generated by the alternator 12 is also supplied to the sub-battery 61 through the processing of steps S206 and S208. Accordingly, in the case where, for example, the main battery 20 is a lead battery, and the sub-battery 61 is a lithium-ion battery, it becomes possible to supply relatively small electric power generated by regenerative deceleration to the sub-battery 61 having high acceptability via the DC-DC converter 71*a*. In other words, it becomes possible to enhance electric power recovery efficiency at the time of regenerative deceleration and to thereby achieve enhancement in fuel efficiency of the vehicle.

When the processing of step S210 is performed, the main battery 20, out of the main battery 20 and the sub-battery 61, supplies electric power to the auxiliary machine loads (the normal load 30, the priority load 40, and the voltage compensation load 50), while the sub-battery 61 does not supply electric power. However, electric power is supplied from the main battery 20 to the sub-battery 61 via the line L7 (the third relay R3).

When it is determined in step S204 that the engine start request is output from the eco-run ECU 25, then in step S214, the ECU 74 sets the first relay R1 in OFF state, the second relay R2 in ON state, and the third relay R3 in OFF state, respectively. Then in step S216, the ECU 74 sets the set value Vdset of the output voltage of the DC-DC converter 71*a* to a predetermined value Vd1 (>Vd0). The predetermined value Vd1 is prescribed in advance in the range of the required voltage of the voltage compensation load 50. Accordingly, even in the case where the starter 11 is driven with the electric power from the main battery 20 at the time of automatic start of the engine 10, so that the voltage of the main battery 20 temporarily drops, the electric power within the range of the required voltage is supplied to the voltage compensation load 50 from the sub-battery 61. Therefore, it becomes possible to avoid the situation where the voltage compensation load 50 suffers from such inconvenience as system reset upon automatic start of the engine 10. Since it is not necessary to provide dedicated hardware (such as a back-up boost converter (BBC)) to avoid such inconvenience, complication, cost increase and the like of the power source system can be avoided.

Figure 5:
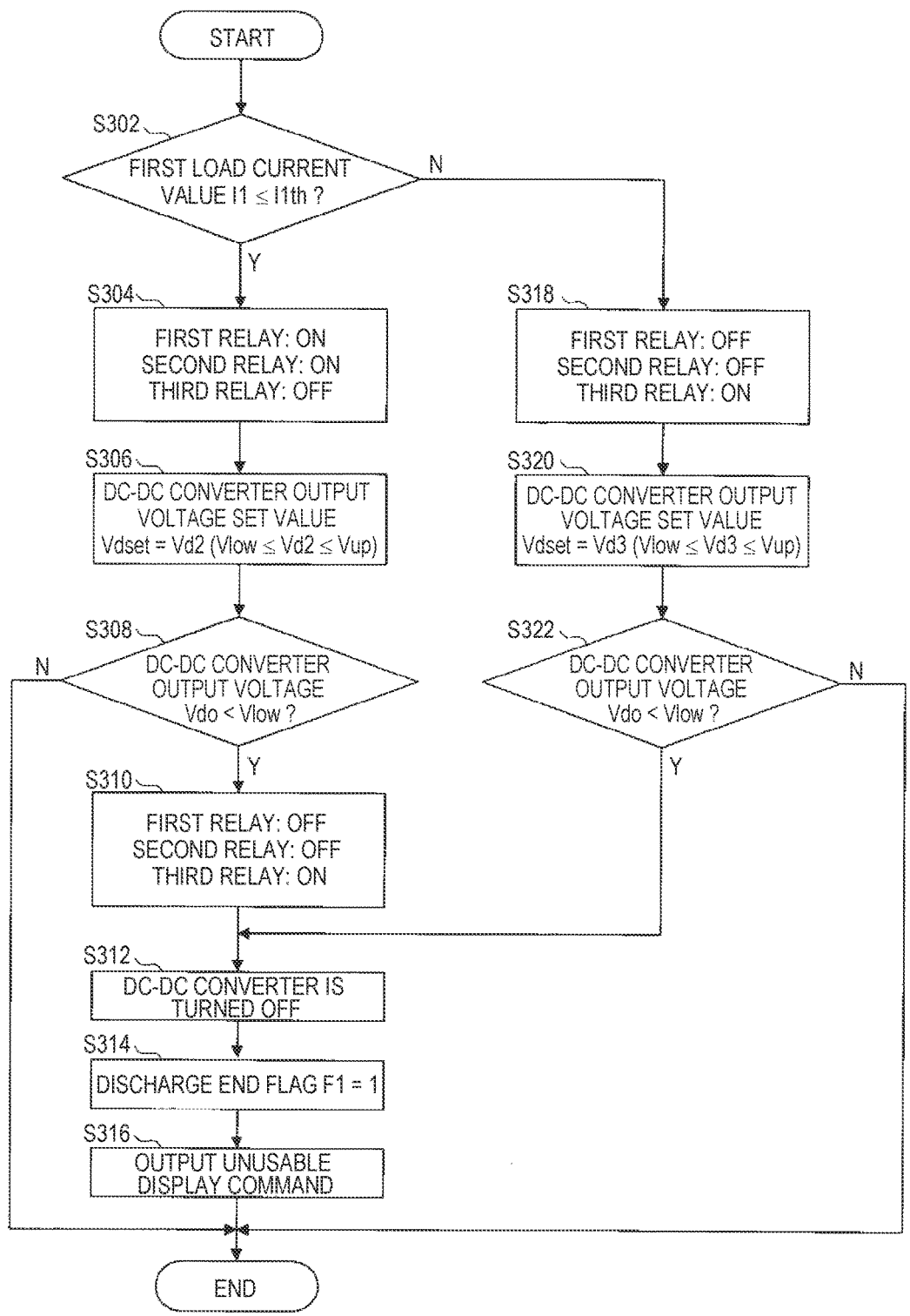
FIG. 5 is a sub-flowchart schematically illustrating one example of backup control processing by the power source system (ECU) according to the first embodiment.

A description is now given of the details of the backup control processing in step S112 of FIG. 3 with reference to FIG. 5.

FIG. 5 is a sub-flowchart schematically illustrating one example of the backup control processing by the power source system 1 according to the present embodiment.

In step S302, when the electric power from the sub-battery 61 is supplied to the auxiliary machine loads, the ECU 74 determines whether or not the electric power supplied from the sub-battery 61 to the priority load 40 is more than the electric power supplied from the sub-battery 61 to other auxiliary machine loads (the normal load 30 and the voltage compensation load 50). Specifically, the ECU 74 determines whether or not a current value I1 (a total current value of the normal loads 30-1 to 30-N) of the normal load 30 (30-1 to 30-N) received from the current sensor 30*s* (30*s*-1 to 30*s*-N) is equal to or below a predetermined threshold value I1*th*. The required electric power (minimum values) of the priority load 40 and the voltage compensation load 50 can be prescribed in advance based on experiments, simulations, specifications of components, and the like. Accordingly, the current value I1 corresponding to the power consumption of the normal load 30, which is constituted of a relatively large number of auxiliary machine loads, is compared with the predetermined threshold value I1*th* prescribed in advance based on the required electric power (current consumption) of the priority load 40 and the voltage compensation load 50. As a consequence, it becomes possible to determine whether or not the electric power supplied from the sub-battery 61 to the priority load 40 is more than the electric power supplied from the sub-battery 61 to other auxiliary machine loads (the normal load 30 and the voltage compensation load 50). When the current value I1 of the normal load 30 is equal to or below the predetermined threshold value I1*th*, the ECU 74 determines that the electric power supplied from the sub-battery 61 to the priority load 40 is more than the electric power supplied from the sub-battery 61 to other auxiliary machine loads (the normal load 30 and the voltage compensation load 50), and advances the processing to step S304. When the current value I1 of the normal load 30 is not equal to or below the predetermined threshold value I1*th*, the ECU 74 determines that the electric power supplied from the sub-battery 61 to the priority load 40 is not more than the electric power supplied from the sub-battery 61 to other auxiliary machine loads (the normal load 30 and the voltage compensation load 50), and advances the processing to step S318.

The predetermined threshold value $I1th$ is calculated based on the current consumption of the priority load 40 and the voltage compensation load 50 assumed based on the specifications and the like of the priority load 40 and the voltage compensation load 50 as described before. Since the voltage compensation load 50 is constituted of a relatively small number of auxiliary machine loads, the current consumption thereof is assumable. Accordingly, the predetermined threshold value $I1th$ can be prescribed in advance in consideration of the current value of the voltage compensation load 50. In step S302, the ECU 74 may use the current value (detection value) of the priority load 40 in place of or in addition to the current value $I1$ of the normal load 30 to determine whether or not the electric power supplied from the sub-battery 61 to the priority load 40 is more than the electric power supplied from the sub-battery 61 to other auxiliary machine loads (the normal load 30 and the voltage compensation load 50). In step S302, the ECU 74 may also use the current value (detection value) of the voltage compensation load 50 in place of or in addition to the current value $I1$ of the normal load 30 to determine whether or not the electric power supplied from the sub-battery 61 to the priority load 40 is more than the electric power supplied from the sub-battery 61 to other auxiliary machine loads (the normal load 30 and the voltage compensation load 50).

In step S304, the ECU 74 sets the first relay R1 in ON state, the second relay R2 in ON state, and the third relay R3 in OFF state, respectively.

In step S306, the ECU 74 sets the set value Vdset of the output voltage of the DC-DC converter 71a to a predetermined value Vd2 (>Vd0) so that the output voltage of the DC-DC converter 71a may fall within a range of the required voltage (a range between an upper limit Vup and a lower limit Vlow) of the priority load 40 prescribed in advance. The predetermined value Vd2 is in the range of the lower limit Vlow of the required voltage of the priority load 40 to the upper limit Vup (Vlow≤Vd2≤Vup). Accordingly, when sufficient electric power is supplied from the sub-battery 61 (when the charging state of the sub-battery 61 is relatively good), the electric power coming from the sub-battery 61 via the DC-DC converter 71a is supplied to the normal load 30, the priority load 40, and the voltage compensation load 50 in a mode that the voltage of the electric power falls within the required voltage of the priority load 40.

The predetermined value Vd2 may be prescribed in consideration of the range of the required voltages of the normal load 30 and the voltage compensation load 50. That is, the predetermined value Vd2 may be prescribed in advance so that the range of all the required voltages of the normal load 30, the priority load 40, and the voltage compensation load is satisfied.

In step S308, the ECU 74 determines whether or not the output voltage Vdo of the DC-DC converter 71a detected by the sensor 73 is less than the lower limit Vlow of the required voltage range of the priority load 40. When the output voltage Vdo of the DC-DC converter 71a is smaller than the lower limit Vlow, the remaining capacity of the sub-battery 61 is low. Accordingly, the ECU 74 determines that the DC-DC converter 71a cannot supply the output voltage that falls within the range of the required voltage of the priority load 40, and advances the processing to step S310. When the output voltage Vdo of the DC-DC converter 71a is not smaller than the lower limit Vlow, the ECU 74 determines that the DC-DC converter 71a can supply the output voltage that falls within the range of the required voltage of the priority load 40, and ends the current processing.

In step S310, the ECU 74 sets the first relay R1 in OFF state, the second relay R2 in OFF state, and the third relay R3 in ON state, respectively. Then in step S312, the ECU 74 stops actuation of the DC-DC converter 71a. That is, the ECU 74 stops electric power supply from the sub-battery 61 to the auxiliary machine loads.

In step S314, the ECU 74 sets the discharge end flag F1 to "1."

In step S316, the ECU 74 displays on a meter in the vehicle cabin an indicator indicating that the main battery 20 and the sub-battery 61 are unusable. Specifically, the ECU 74 outputs an unusable display request to a meter ECU (not illustrated) through the in-vehicle network (such as the CAN). In response to the request, the meter ECU displays in the meter an indicator indicating that the main battery 20 and the sub-battery 61 are unusable.

When the current value $I1$ of the normal load 30 is not equal to or below the predetermined threshold value $I1th$ in step S302, then in step 318, the ECU 74 sets the first relay R1 in OFF state, the second relay R2 in OFF state, and the third relay R3 in ON state, respectively.

Then, in step S320, the ECU 74 sets the set value Vdset of the DC-DC converter 71a to a predetermined value Vd3 (>Vd0) so that the output voltage Vdo of the DC-DC converter 71a may fall within the range of the required voltage (the range between the upper limit Vup and the lower limit Vlow) of the priority load 40 prescribed in advance. The predetermined value Vd3 is in the range of the lower limit Vlow to the upper limit Vup of the required voltage of the priority load 40 (Vlow≤Vd3≤Vup). Accordingly, when sufficient electric power is supplied from the sub-battery 61 (when the charging state of the sub-battery 61 is relatively good), the electric power coming from the sub-battery 61 via the DC-DC converter 71a is supplied only to the priority load 40 among the normal load 30, the priority load 40, and the voltage compensation load 50 in a mode that the voltage of the electric power falls within the required voltage of the priority load 40.

The predetermined value Vd3 may be a value equal to the predetermined value Vd2, when the predetermined value Vd2 is prescribed in the mode where the required voltages of the normal load 30 and the voltage compensation load 50 are not taken into consideration.

In step S322, the ECU 74 determines whether or not the output voltage Vdo of the DC-DC converter 71a detected by the sensor 73 is smaller than the lower limit Vlow in the range of the required voltage of the priority load 40 as in step S308. When the output voltage Vdo of the DC-DC converter 71a is smaller than the lower limit Vlow, the remaining capacity of the sub-battery 61 is low. Accordingly, the ECU 74 determines that the DC-DC converter 71a cannot supply the output voltage that falls within the range of the required voltage of the priority load 40, and advances the processing to step S312. When the output voltage Vdo of the DC-DC converter 71a is not smaller than the lower limit Vlow, the ECU 74 determines that the DC-DC converter 71a can supply the output voltage that falls within the range of the required voltage of the priority load 40, and ends the current processing.

When the output voltage Vdo of the DC-DC converter 71a detected by the sensor 73 in step S322 is smaller than the lower limit Vlow in the range of the required voltage of the priority load 40, the ECU 74 performs the processing of steps S312 to S316 described before.

Thus, when it is determined that the output electric power of the main battery 20 is less than the required electric power of the auxiliary machine loads (the normal load 30, the priority load 40, the voltage compensation load 50), the ECU 74 controls the regulation unit 71 (the DC-DC converter 71a) and the switch unit 72 (the first relay R1 and the second relay R2) so that the electric power from the sub-battery 61 is supplied at least to the priority load 40 among the auxiliary machine loads (the normal load 30, the priority load 40, the voltage compensation load 50) and that the electric power supplied from the sub-battery 61 to the priority load 40 is more than the electric power supplied from the sub-battery 61 to the normal load 30 and the voltage compensation load 50.

Specifically, when it is determined that the output electric power of the main battery 20 is less than the required electric power of the auxiliary machine loads and when it is determined that the electric power supplied from the sub-battery 61 to the priority load 40 is more than the electric power supplied from the sub-battery 61 to the normal load 30 and the voltage compensation load 50 based on the detection result of the current sensor 30s, the ECU 74 controls the regulation unit 71 (the DC-DC converter 71a) so that the electric power from the sub-battery 61 is supplied downstream, and also controls the switch unit 72 (the first relay R1, the second relay R2) so that the electric power coming from the sub-battery 61 via the DC-DC converter 71a is supplied to the normal load 30 and the voltage compensation load 50. That is, the ECU 74 controls the regulation unit 71 (the DC-DC converter 71a) and the switch unit 72 (the first relay R1, the second relay R2) so that the electric power from the sub-battery 61 is supplied to the normal load 30, the voltage compensation load 50, and the priority load 40. Accordingly, in the situation where when the electric power is supplied from the sub-battery 61 to both a) the normal load 30 and the voltage compensation load 50 and b) the priority load 40, more electric power is supplied to the priority load 40, it becomes possible to supply more electric power to the priority load 40 from the sub-battery 61, while supplying the electric power from the sub-battery 61 to both a) the normal load 30 and the voltage compensation load 50 and b) the priority load 40. On the contrary, when it is determined that the electric power supplied from the sub-battery 61 to the priority load 40 is not more than the electric power supplied from the sub-battery 61 to the normal load 30 and the voltage compensation load 50, the ECU 74 controls the regulation unit 71 (the DC-DC converter 71a) so that the electric power from the sub-battery 61 is supplied downstream, while controlling the switch unit 72 (the first relay R1, the second relay R2) so that the electric power coming from the sub-battery 61 via the DC-DC converter 71a is not supplied to the normal load 30 and the voltage compensation load 50. That is, the ECU 74 controls the regulation unit 71 (the DC-DC converter 71a) and the switch unit 72 (the first relay R1, the second relay R2) so that the electric power from the sub-battery 61 is supplied only to the priority load 40 among the normal load 30, the voltage compensation load 50, and the priority load 40. Accordingly, in the situation where when the electric power is supplied from the sub-battery 61 to both a) the normal load 30 and the voltage compensation load 50 and b) the priority load 40, more electric power is not supplied to the priority load 40, it becomes possible to supply more electric power from the sub-battery 6 to the priority load 40 by supplying the electric power from the sub-battery 61 only to the priority load 40 among the normal load 30, the voltage compensation load 50, and the priority load 40. Accordingly, regardless of whether more electric power is supplied to the priority load 40 or not as a result of supplying the electric power from the sub-battery 61 to both a) the normal load 30 and the voltage compensation load 50 and b) the priority load 40 upon drop of output from the main battery 20, the ECU 74 can still supply more electric power from the sub-battery 61 to the priority load 40 that is an auxiliary machine load high in the actuation priority. Therefore, when the output of the main battery 20 drops, the priority load 40 high in the actuation priority can reliably be actuated with electric power supply from the sub-battery 61.

When it is determined that the output electric power of the main battery 20 is less than the required electric power of the auxiliary machine loads, the ECU 74 controls the output voltage of the DC-DC converter 71a so as to fall within the range of the required voltage of the priority load 40. Accordingly, when the output electric power of the main battery 20 drops, the electric power from the sub-battery 61 is supplied to the priority load 40 within the range of the required voltage of the priority load 40 through the DC-DC converter 71a. As a result, it becomes possible to more reliably actuate the priority load 40 that is an auxiliary machine load high in the actuation priority.

When abnormalities occur in the alternator 12, it is highly likely that the main battery 20 cannot be charged, and therefore the ECU 74 performs the same operation as in the case of determining that the output electric power of the main battery 20 is less than the required electric power of the auxiliary machine loads. As a consequence, in the case where abnormalities occur in the alternator 12 so that the main battery 20 cannot be charged, the electric power from the sub-battery 61 is supplied at least to the priority load 40. Therefore, it becomes possible to more reliably actuate the priority load 40 high in the actuation priority with electric power supply from the sub-battery 61.

A description is now given of a second embodiment.

The power source system 1 according to the second embodiment is different from the power source system 1 in the first embodiment in the content of the backup control processing by the ECU 74. Hereinafter, a description will be mainly given of a difference from the first embodiment.

Figure 6:
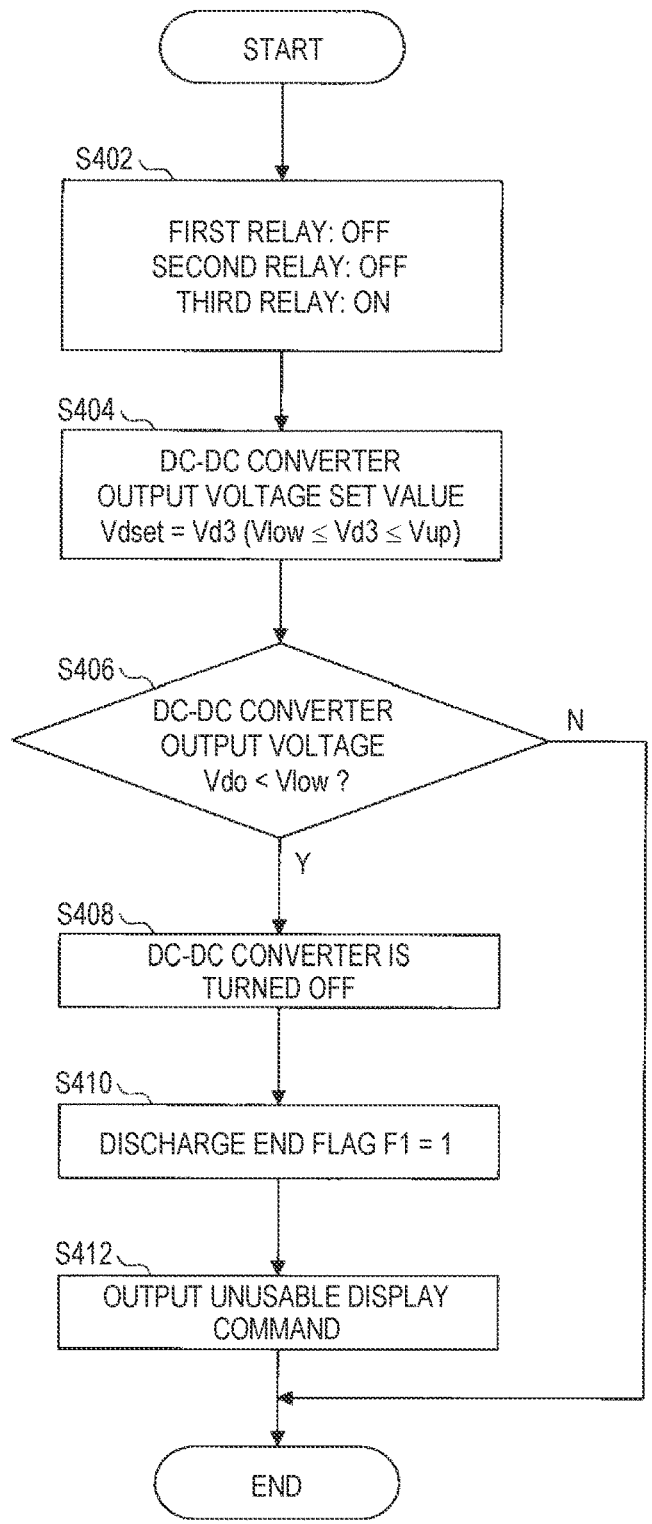
FIG. 6 is a sub-flowchart schematically illustrating one example of backup control processing by the power source system (ECU) according to a second embodiment.

FIG. 6 is a sub-flowchart schematically illustrating one example of the backup control processing according to the present embodiment.

Like FIG. 5 in the first embodiment, FIG. 6 illustrates the details of the backup control processing of step S112 in the main processing by the ECU 74 in FIG. 3

In the backup control processing illustrated in FIG. 6, the processing of steps S302 to S310 is omitted from the backup control processing illustrated in FIG. 5 in the first embodiment. That is, steps S402 to S406 are the same as the processing of steps S318 to S322 in FIG. 5, and the processing of steps S408 to S412 are the same as the processing of step S312 to S316 in FIG. 5. Accordingly, further description thereof is omitted.

Thus, in the present embodiment, when it is determined that the output electric power of the main battery 20 is less than the required electric power of the auxiliary machine loads (the normal load 30, the voltage compensation load 50, and the priority load 40), the ECU 74 controls the regulation unit 71 (the DC-DC converter 71a) so that the electric power from the sub-battery 61 is supplied downstream, while controlling the switch unit 72 (the first relay R1, the second relay R2) so that the electric power coming from the sub-battery 61 via the DC-DC converter 71a is not supplied to the normal load 30 and the voltage compensation load 50. That is, the ECU 74 controls the regulation unit 71 (the DC-DC converter 71a) and the switch unit 72 (the first relay R1, the second relay R2) so that the electric power from the sub-battery 61 is supplied only to the priority load 40 among the normal load 30, the voltage compensation load 50, and the priority load 40. Therefore, when the output from the main battery 20 drops, the electric power from the sub-battery 61 is not supplied to the normal load 30 and the voltage compensation load 50, but is intensively supplied to the priority load 40 high in the actuation priority. Accordingly, even more electric power can be supplied to the priority load 40 that is an auxiliary machine load high in the actuation priority. Therefore, it becomes possible to more reliably actuate the priority load 40 high in the actuation priority with the electric power supply from the sub-battery 61 when the output of the main battery 20 drops.

When it is determined that the output electric power of the main battery 20 is less than the required electric power of the auxiliary machine loads, the ECU 74 controls the output voltage of the DC-DC converter 71a so as to fall within the range of the required voltage of the priority load 40 as in the first embodiment. As a result, the same function and effect as in the first embodiment are demonstrated.

When abnormalities occur in the alternator 12, it is highly likely that the main battery 20 cannot be charged, and therefore, the ECU 74 performs the same operation as in the case of determining that the output electric power of the main battery 20 is less than the required electric power of the auxiliary machine loads as in the first embodiment. As a consequence, in the case where abnormalities occur in the alternator 12 so that the main battery 20 cannot be charged, the electric power from the sub-battery 61 is supplied to the priority load 40. Therefore, it becomes possible to more reliably actuate the priority load 40 high in the actuation priority with electric power supply from the sub-battery 61.

A description is now given of a third embodiment.

The power source system 1 according to the present embodiment is different the power source system 1 in the first and second embodiments in the point that the regulation unit 71 includes a fourth relay R4 and in the content of the backup control processing by the ECU 74. Hereinafter, the component members having the same configuration as in the first and second embodiments are designated by the same reference signs, and a description is mainly given of a difference from the first and second embodiments.

Figure 7:
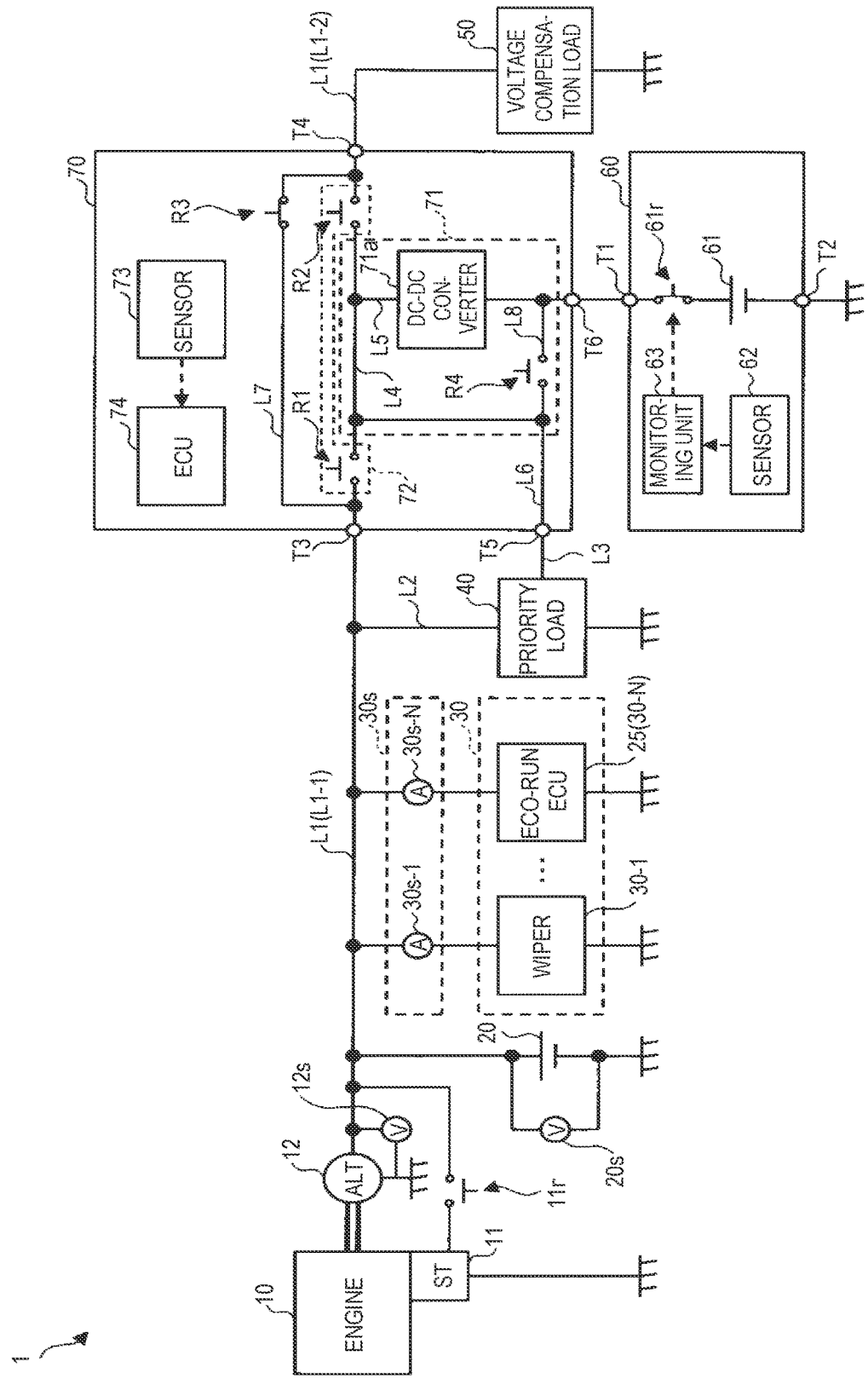
FIG. 7 is a configuration diagram illustrating one example of the configuration of the power supply system of the power source system according to a third embodiment.
Figure 8:
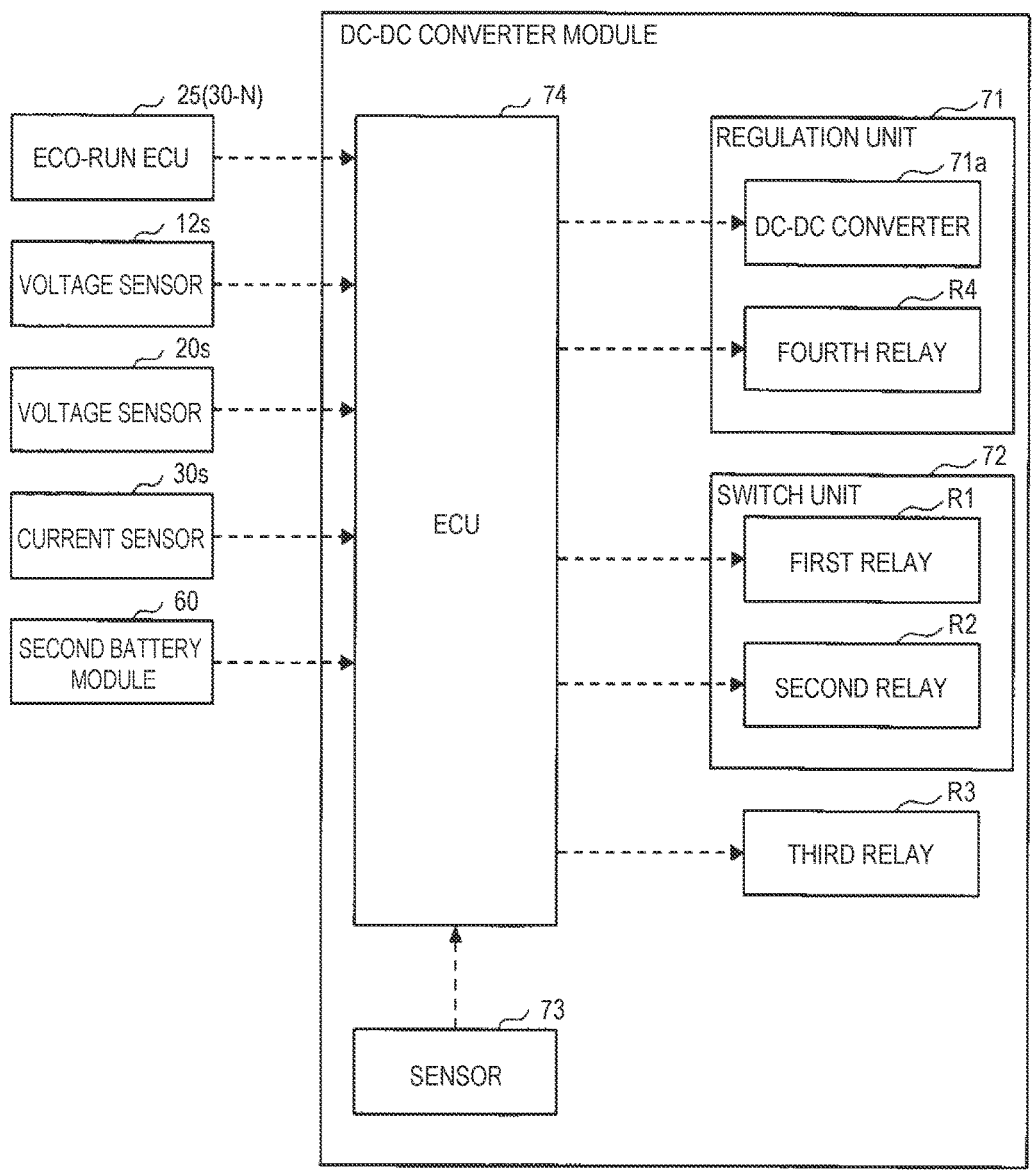
FIG. 8 is a block diagram illustrating one example of the configuration of the control system of the power source system according to the third embodiment.

FIG. 7 is a configuration diagram illustrating one example of the configuration of the power supply system of the power source system 1 according to the present embodiment. FIG. 8 is a block diagram illustrating one example of the configuration of the control system of the power source system 1 according to the present embodiment.

The regulation unit 71 includes the DC-DC converter 71a and the fourth relay R4.

The fourth relay R4 is provided in a line L8 that connects a midpoint of a connection path between an input terminal (a terminal connected to the sub-battery 61) of the DC-DC converter 71a and the terminal T6 and a midpoint of the line L6 connecting between the terminal T5 and the line L4. That is, the fourth relay R4 is provided in a bypass route (the line L8) that bypasses the DC-DC converter 71a to connect the electric power of the sub-battery 61. Accordingly, when the fourth relay R4 is in an opened state (OFF state), the electric power of the sub-battery 61 supplied to the line L4 via the DC-DC converter 71a passes through the line L6, the terminal T5, and the line L3 and is supplied to the priority load 40. Meanwhile, when the fourth relay R4 is in a closed state (ON state), and actuation of the DC-DC converter 71a is stopped, the electric power of the sub-battery 61 passes through the line L8 that bypasses the DC-DC converter 71a, the line L6, the terminal T5, and the line L3 and is supplied to the priority load 40.

The normal processing of the present embodiment is the same as the normal processing of the first embodiment (FIG. 4). In the normal processing, the fourth relay R4 is maintained in the opened state (OFF state) by the ECU 74.

The ECU 74 is an electronic control unit that controls the actuation state of the regulation unit 71 (the DC-DC converter 71a, the fourth relay R4), the switch unit 72 (the first relay R1, the second relay R2), and the third relay R3. The ECU 74 controls the units to switch the presence of electric power supply to the auxiliary machine loads (the normal load 30, the priority load 40, and the voltage compensation load 50) from the sub-battery 61.

Figure 9:
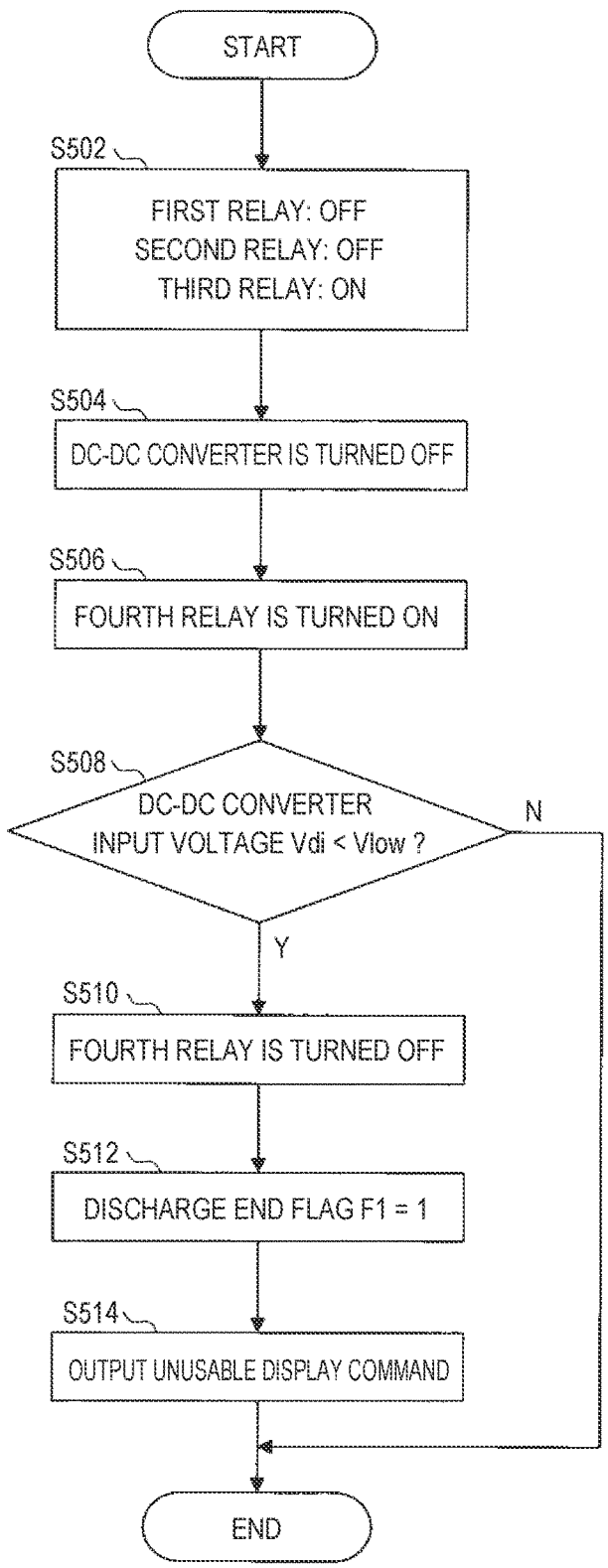
FIG. 9 is a sub-flowchart schematically illustrating one example of the backup control processing by the power source system (ECU) according to the third embodiment.

FIG. 9 is a sub-flowchart schematically illustrating one example of the backup control processing according to the present embodiment.

Like FIG. 5 in the first embodiment and FIG. 6 in the second embodiment, FIG. 9 illustrates the details of the backup control processing of step S112 in the main processing by the ECU 74 in FIG. 3.

In step S502, the ECU 74 sets the first relay R1 in OFF state, the second relay R2 in OFF state, and the third relay R3 in ON state, respectively.

In step S504, the ECU 74 stops actuation of the DC-DC converter 71a.

In step S506, the ECU 74 sets the fourth relay R4 in ON state.

As a result of the processing of steps S502 to S506, the electric power of the sub-battery 61 is not supplied to the normal load 30 and the voltage compensation load 50, but is supplied to the priority load 40 with the DC-DC converter 71a being bypassed.

In step S508, the ECU 74 determines whether or not an input voltage Vdi of the DC-DC converter 71a (i.e., voltage V2 of the sub-battery 61) detected by the sensor 73 (one example of a fifth detection unit) is less than the lower limit Vlow in the range of the required voltage of the priority load 40. When the input voltage Vdi of the DC-DC converter 71a is smaller than the lower limit Vlow, the remaining capacity of the sub-battery 61 is low. Accordingly, the ECU 74 determines that the sub-battery 61 cannot supply the electric power that falls within the range of the required voltage of the priority load 40, and advances the processing to step S510. When the input voltage Vdi of the DC-DC converter 71a is not smaller than the lower limit Vlow, the ECU 74 determines that the DC-DC converter 71a can supply the electric power that falls within the range of the required voltage of the priority load 40, and ends the current processing.

In step S508, the ECU 74 may determine whether or not the voltage V2 of the sub-battery 61 received from the sensor 62 (one example of the fifth detection unit) of the sub-battery module 60 is smaller than the lower limit Vlow in the range of the required voltage of the priority load 40.

In step S510, the ECU 74 sets the fourth relay R4 in OFF state. That is, the ECU 74 stops electric power supply from the sub-battery 61 to the priority load 40.

In step S512, the ECU 74 sets the discharge end flag F1 to "1."

In step S514, the ECU 74 displays on a meter in the vehicle cabin an indicator indicating that the main battery 20 and the sub-battery 61 are unusable as in step S316 in FIG. 5 in the first embodiment.

Thus, in the present embodiment, when it is determined that the output electric power of the main battery 20 is not less than the required electric power of the auxiliary machine loads (the normal load 30, the priority load 40, the voltage compensation load 50), the ECU 74 controls the output voltage of the DC-DC converter 71a so that the electric power of the sub-battery 61 is not supplied downstream while putting the fourth relay R4 in a disconnected state. When it is determined that the output electric power of the main battery 20 is less than the required electric power of the auxiliary machine loads, the ECU 74 stops actuation of the DC-DC converter 71a while controlling the fourth relay R4 to be in a connected state. Therefore, when the output of the main battery 20 drops, the electric power from the sub-battery 61 is supplied to the priority load 40 with the DC-DC converter 71a being bypassed. Accordingly, it becomes possible to reduce a circuit loss in the DC-DC converter 71a at the time of supplying the electric power to the priority load 40, so that efficient use of the electric power of the sub-battery 61 can be achieved.

In the present embodiment, the DC-DC converter 71a (configured to supply the electric power of the sub-battery 61 to the priority load 40 via the DC-DC converter 71a) may be omitted. In the case of such a modification, the processing of step S504 is omitted, and in step S508, determination processing is executed using the voltage V2 of the sub-battery 61 detected by the sensor 62 in place of the input voltage Vdi of the DC-DC converter 71a. That is, when it is determined that the output electric power of the main battery 20 is not less than the required electric power of the auxiliary machine loads (the normal load 30, the priority load 40, the voltage compensation load 50), the ECU 74 puts the fourth relay R4 in the disconnected state. When it is determined that the output electric power of the main battery 20 is less than the required electric power of the auxiliary machine loads, the ECU 74 puts the fourth relay R4 in the connected state. Accordingly, the modification provides the same function and effect as in the third embodiment described before. In the modification, steps S208, S212, and S216 in FIG. 4 (normal control processing) are omitted.

A description is now given of a fourth embodiment.

The power source system 1 according to the present embodiment is different from the power source system 1 in the first and second embodiments in the point that the regulation unit 71 further includes a fourth relay R4 as in the third embodiment. The power source system 1 according to the present embodiment is different in the content of the backup control processing by the ECU 74 from the power source system 1 in the first to third embodiments. Hereinafter, a description is mainly given of a difference from the first to third embodiments.

As in the third embodiment, the configuration of the power source system 1 according to the present embodiment is presented in FIGS. 7 and 8, and therefore the description of the configuration is omitted. The normal processing of the present embodiment is the same as the normal processing of the first embodiment (FIG. 4). In the normal processing, the fourth relay R4 is maintained in an opened state (OFF state) by the ECU 74.

Figure 10:
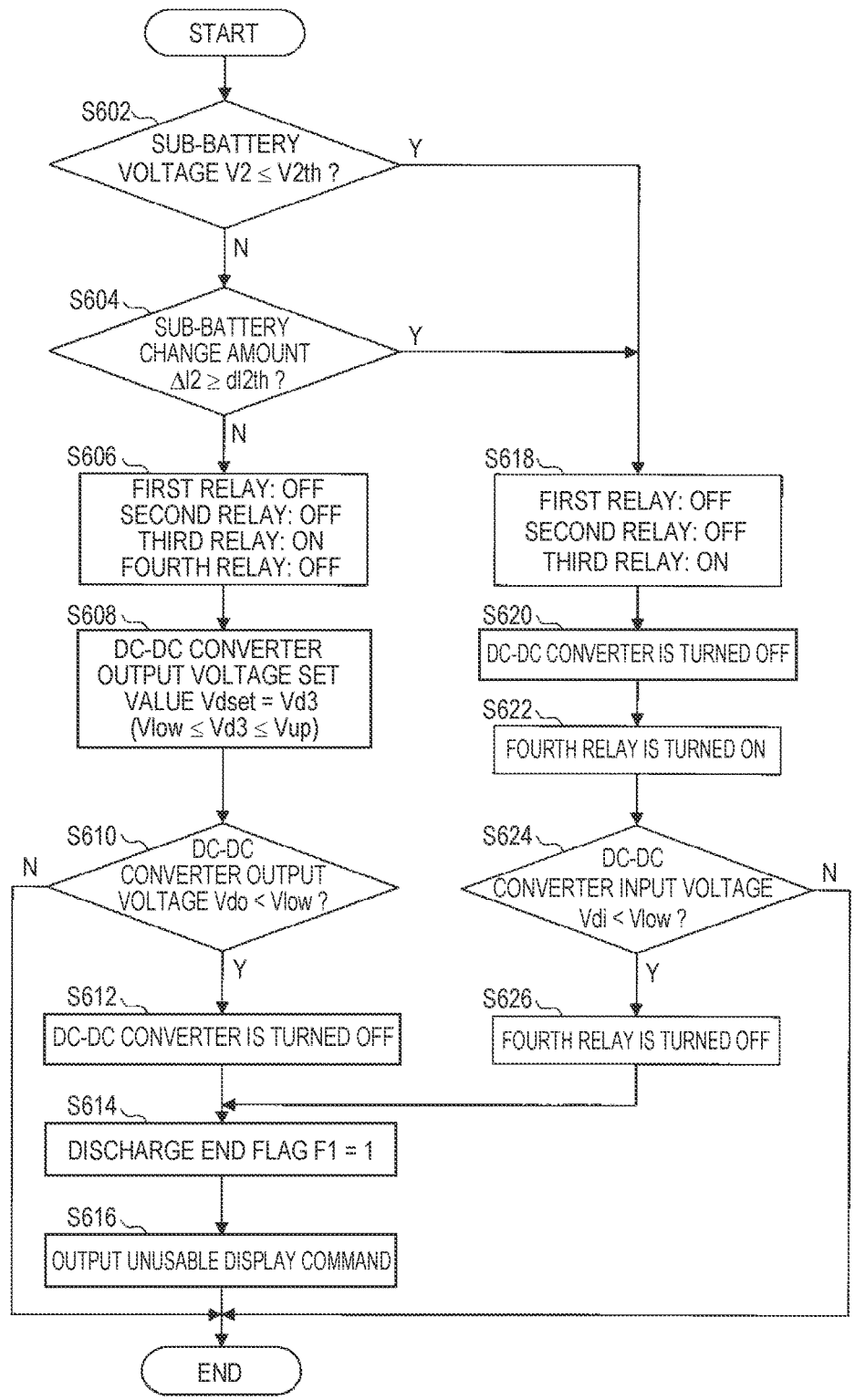
FIG. 10 is a sub-flowchart schematically illustrating one example of the backup control processing by the power source system (ECU) according to a fourth embodiment.

FIG. 10 is a sub-flowchart schematically illustrating one example of the backup control processing according to the present embodiment.

Like FIG. 5 in the first embodiment, FIG. 6 in the second embodiment, and FIG. 9 in the third embodiment, FIG. 10 illustrates the details of the backup control processing of step S112 in the main processing by the ECU 74 in FIG. 3.

In step S602, the ECU 74 determines whether or not the remaining capacity (charging state) of the sub-battery 61 drops to a reference value prescribed in advance or below. Specifically, the ECU 74 determines whether or not the voltage V2 of the sub-battery 61 received from the sensor 62 (one example of the third detection unit) of the sub-battery module 60 is equal to or below the predetermined threshold value V2th. When it is determined that the voltage V2 of the sub-battery 61 is not equal to or below the predetermined threshold value V2th, the ECU 74 determines that the remaining capacity of the sub-battery 61 is not equal to or below the reference value prescribed in advance, and advances the processing to step S604. When the voltage V2 of the sub-battery 61 is equal to or below the predetermined threshold value V2th, the ECU 74 determines that the remaining capacity of the sub-battery 61 is equal to or below the reference value prescribed in advance, and advances the processing to step S618.

The predetermined threshold value V2th is prescribed in advance based on factors such as the characteristics of the sub-battery 61. The predetermined threshold value V2th is set to a value sufficiently larger than the value of the voltage V2 of the sub-battery 61 when the output voltage Vdo of the DC-DC converter 71a is smaller than the lower limit Vlow of the required voltage of the priority load 40 (in the case of Y in steps S610 and S624).

In step S604, the ECU 74 determines whether or not a required current value of the priority load 40 is equal to or above a reference value prescribed in advance. Specifically, the ECU 74 determines whether or not a change amount (current change amount) ΔI2 (corresponding to current change speed of the sub-battery 61) from a previous value of the current I2 of the sub-battery 61 received from the sensor 62 (one example of the fourth detection unit) of the sub-battery module 60 is equal to or above a predetermined threshold value dI2th. When the current change amount 412 of the sub-battery 61 is not equal to or above the predetermined threshold value dI2th, the ECU 74 determines that the required current value of the priority load 40 is not equal to or above the reference value prescribed in advance, and advances the processing to step S606. When the current change amount ΔI2 of the sub-battery 61 is equal to or above the predetermined threshold value dI2th, the ECU 74 determines that the required current value of the priority load 40 is equal to or above the reference value prescribed in advance, and advances the processing to step S618.

The predetermined threshold value dI2th is prescribed in advance based on factors such as specifications and characteristics of the sub-battery 61, the DC-DC converter 71a and the like.

In step S606, the ECU 74 sets the first relay R1 in OFF state, the second relay R2 in OFF state, the third relay R3 in ON state, and the fourth relay R4 in OFF state, respectively. That is, the processing of step S606 is the same as the processing of step S402 in FIG. 6 in the second embodiment except that the fourth relay R4 is set in OFF state.

Since the processing of steps S608 to S616 is the same as the processing of steps S404 to S412 in the second embodiment in the FIG. 6, the description thereof is omitted.

Since the processing of steps S618 to S626, and steps S614 and S616 subsequent to steps S618 to S626 is the same as the processing of steps S502 to S514 in FIG. 9 in the third embodiment, the description thereof is omitted.

Thus, in the present embodiment, when it is determined that the output electric power of the main battery 20 is not less than the required electric power of the auxiliary machine loads (the normal load 30, the priority load 40, the voltage compensation load 50), the ECU 74 controls the output voltage of the DC-DC converter 71a so that the electric power from the sub-battery 61 is not supplied downstream while controlling the fourth relay R4 to be in OFF state. Moreover, when it is determined that the output electric power of the main battery 20 is less than the required electric power of the auxiliary machine loads and the voltage V2 of the sub-battery 61 is equal to or below the predetermined threshold value V2th(i.e., when outputtable electric power of the sub-battery 61 drops), or when the current change amount ΔI2 is equal to or above the predetermined threshold value dI2th(i.e., when the required current value of the priority load 40 becomes large), the ECU 74 stops actuation of the DC-DC converter 71a, while controlling the fourth relay R4 to be in ON state. When the voltage V2 of the sub-battery 61 is not equal to or below the predetermined threshold value V2th and the current change amount ΔI2 is not equal to or above the predetermined threshold value dI2th, the ECU 74 controls the output voltage of the DC-DC converter so as to fall within a range of the required voltage of the priority load 40 while controlling the fourth relay R4 to be in Off state. Accordingly, when the electric power outputtable from the sub-battery 61 drops, or when the required current value of the priority load 40 is large, the electric power of the sub-battery 61 is supplied to the priority load 40 with the DC-DC converter 71a being bypassed. Otherwise, the electric power coming from the sub-battery 61 via the DC-DC converter 71a is supplied to the priority load 40 within the range of the required voltage of the priority load 40. Accordingly, when the electric power outputtable from the sub-battery 61 drops, bypassing the DC-DC converter 71a may reduce a circuit loss and may further lengthen a period of time in which the electric power can be supplied from the sub-battery 61 to the priority load 40. When the required current value of the priority load 40 is large, the system may fail to follow up a current change if the DC-DC converter 71a is used. By bypassing the DC-DC converter 71a, the capability of following up the required current value of the priority load 40 can be secured. On the contrary, when the electric power outputtable from the sub-battery 61 does not drop and the required current value of the priority load 40 is not large, the electric power coming from the sub-battery 61 via the DC-DC converter 71a is supplied to the priority load 40 within the range of the required voltage of the priority load 40. Accordingly, it becomes possible to more reliably actuate the priority load 40 that is an auxiliary machine load high in the actuation priority.

The present disclosure is not limited to the specific embodiments disclosed, but various changes and modifications are possible.

Figure 11:
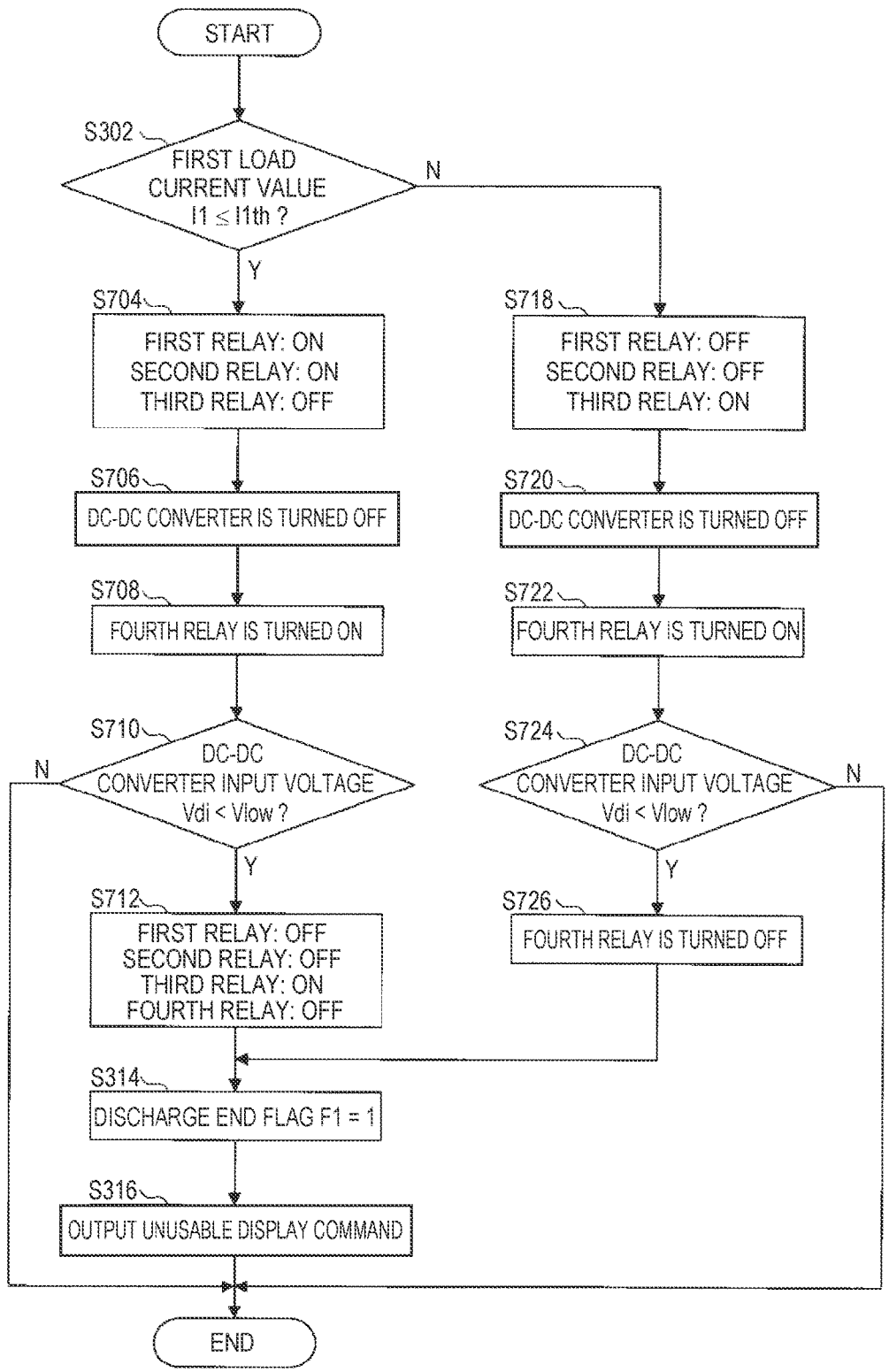
FIG. 11 is a sub-flowchart schematically illustrating one example of the backup control processing by the power source system (ECU) according to a first modification of the first embodiment.

For example, in the processing of steps S304 and S306 in the backup control processing (FIG. 5) of the first embodiment, the electric power of the sub-battery 61 is supplied to the auxiliary machine loads (the normal load 30, the priority load 40, the voltage compensation load 50) through the DC-DC converter 71a. However, the configuration illustrated in FIG. 7 may be adopted to implement a mode of supplying electric power (through the fourth relay R4) with the DC-DC converter 71a being bypassed. Similarly, in the processing of steps S318 and S320, the electric power of the sub-battery 61 is supplied to the priority load 40 through the DC-DC converter 71a. However, a mode of supplying the electric power (through the fourth relay R4) with the DC-DC converter 71a being bypassed may be adopted. Specifically, as illustrated in FIG. 11, steps S304 to S312 are replaced with step S704 to S712, and steps S318 to S322 and step S312 subsequent to steps S318 to S322 are replaced with steps S718 to S726. Hereinafter, processing of steps S704 to S712 and steps S718 to S726 will be described.

In step S704, the ECU 74 sets the first relay R1 in ON state, the second relay R2 in ON state, and the third relay R3 in OFF state, respectively.

In step S706, the ECU 74 stops actuation of the DC-DC converter 71a.

In step S708, the ECU 74 sets the fourth relay R4 in ON state.

Through the processing of steps S704 to S708, the electric power of the sub-battery 61 is supplied to the auxiliary machine loads (the normal load 30, the priority load 40, the voltage compensation load 50) with the DC-DC converter 71a being bypassed.

In step S710, the ECU 74 determines whether or not the input voltage Vdi of the DC-DC converter 71a (i.e., the voltage V2 of the sub-battery 61) detected by the sensor 73 is less than the lower limit Vlow in the range of the required voltage of the priority load 40. When the input voltage Vdi of the DC-DC converter 71a is smaller than the lower limit Vlow, the remaining capacity of the sub-battery 61 is low. Accordingly, the ECU 74 determines that the sub-battery 61 cannot supply the electric power that falls within the range of the required voltage of the priority load 40, and advances the processing to step S712. When the input voltage Vdi of the DC-DC converter 71a is not smaller than the lower limit Vlow, the ECU 74 determines that the sub-battery 61 can supply the electric power that falls within the range of the required voltage of the priority load 40, and ends the current processing.

In step S710, the ECU 74 may determine whether or not the voltage V2 of the sub-battery 61 received from the sub-battery module 60 (the sensor 62) is smaller than the lower limit Vlow in the range of the required voltage of the priority load 40.

In step S712, the ECU 74 sets the first relay R1 in OFF state, the second relay R2 in OFF state, the third relay R3 in ON state, and the fourth relay R4 in OFF state. That is, the ECU 74 stops electric power supply from the sub-battery 61 to the auxiliary machine loads (the normal load 30, the priority load 40, the voltage compensation load 50), and advances the processing to step S314.

The processing of steps S718 to S726 is the same as the processing of steps S502 to S510 in FIG. 7 in the third embodiment. Accordingly, the description thereof is omitted.

In such a modification, the DC-DC converter 71a (configured to supply the electric power of the sub-battery 61 to the auxiliary machine loads (the normal load 30, the priority load 40, and the voltage compensation load 50) via the DC-DC converter 71a) may be omitted. In this case, the processing of steps S706 and S720 is omitted, and in steps S710 and S724, determination processing is executed using the voltage V2 of the sub-battery 61 detected by the sensor 62 in place of the input voltage Vdi of the DC-DC converter 71a. In this case, steps S208, S212, and S216 in FIG. 4 (normal control processing) are omitted.

Figure 12A:
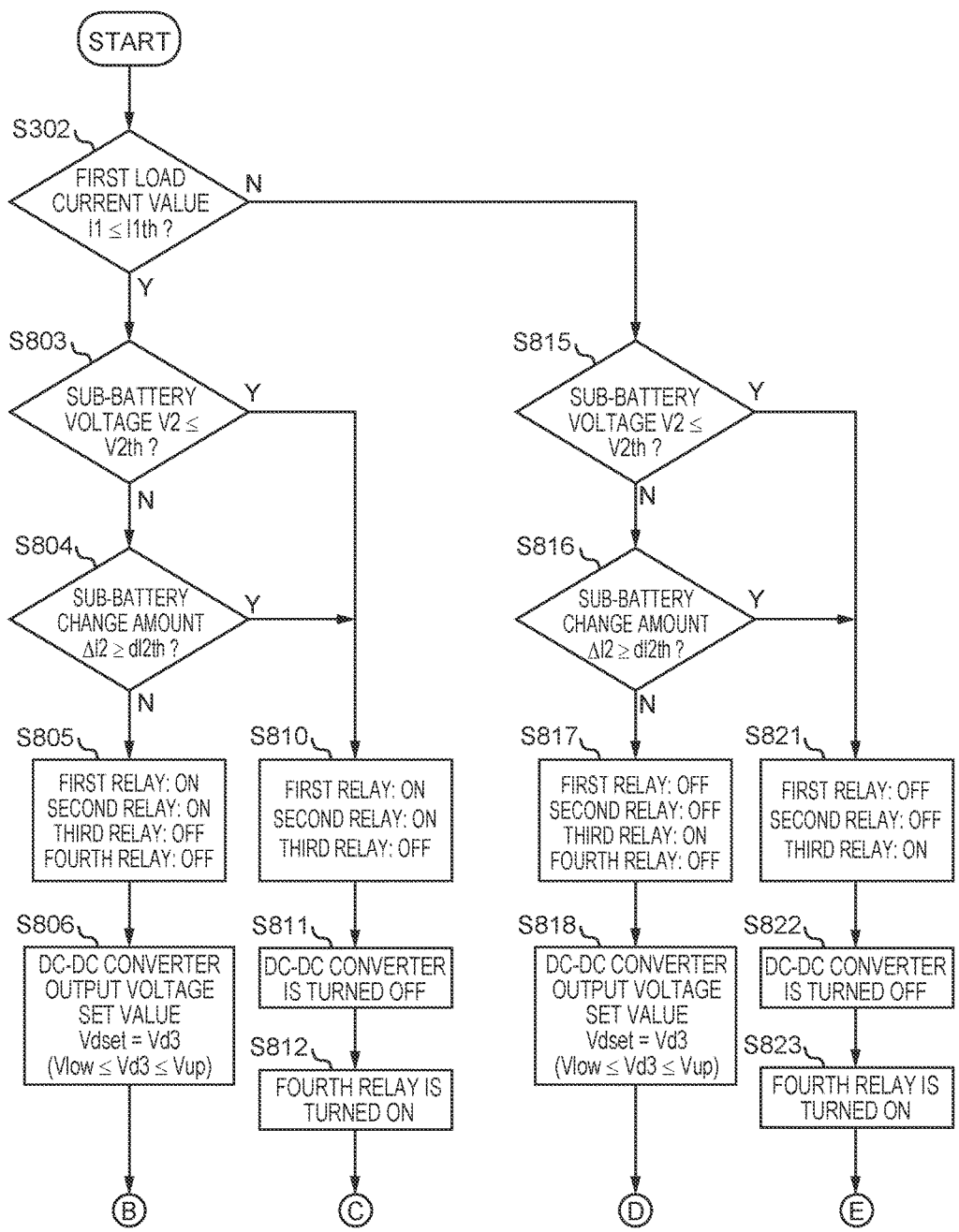
FIG. 12A is a sub-flowchart schematically illustrating one example of the backup control processing by the power source system (ECU) according to a second modification of the first embodiment.
Figure 12B:
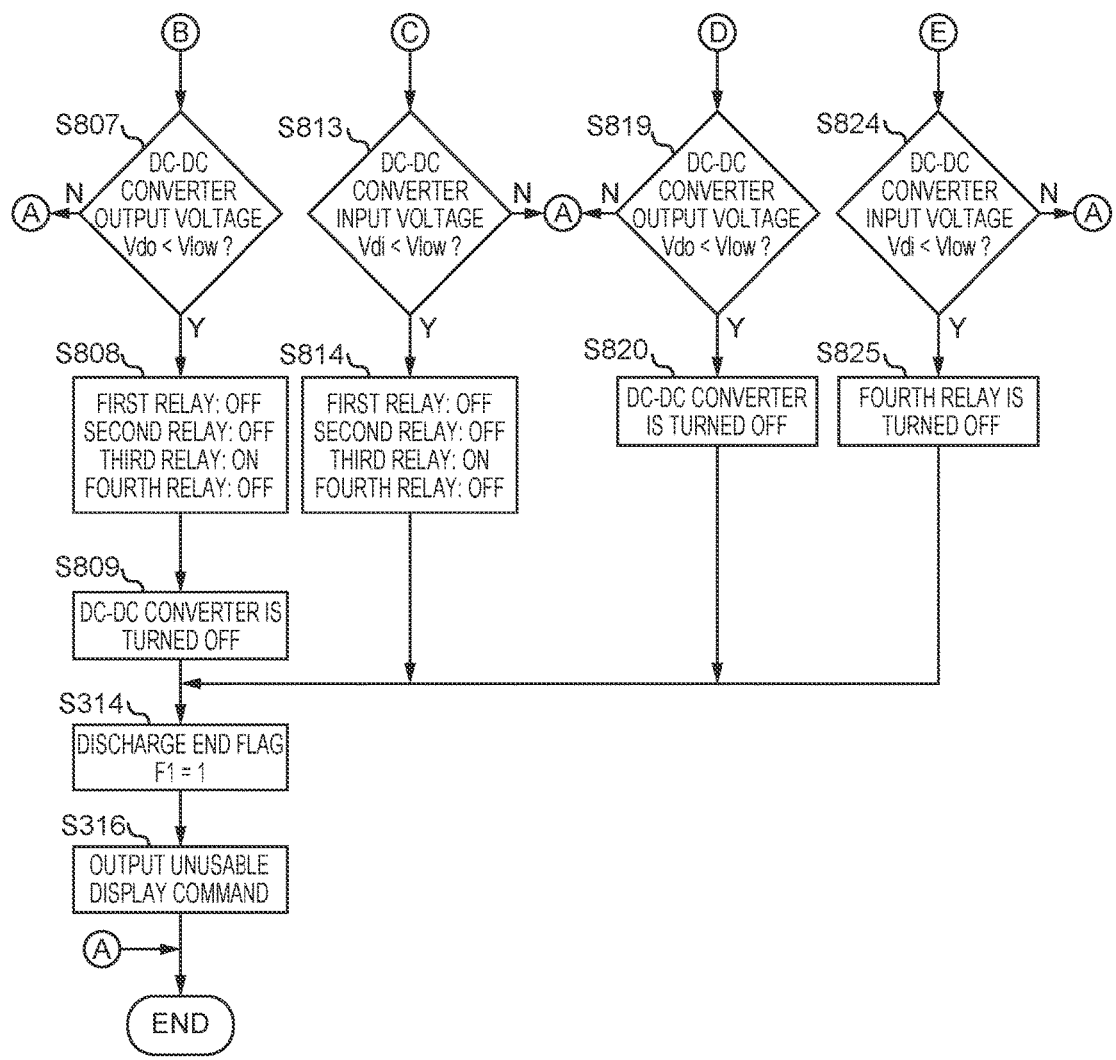
FIG. 12B is a sub-flowchart schematically illustrating one example of the backup control processing by the power source system (ECU) according to a second modification of the first embodiment.

In the processing of steps S304 and S306 in the backup control processing (FIG. 5) of the first embodiment, the electric power of the sub-battery 61 is supplied to the auxiliary machine loads (the normal load 30, the priority load 40, the voltage compensation load 50) through the DC-DC converter 71a. However, the system may be configured to be switched to a mode of supplying the electric power (through the fourth relay R4) with the DC-DC converter 71a being bypassed, depending on the remaining capacity of the sub-battery 61 or the required current values of the auxiliary machine loads. Similarly, in the processing of step S318 and S320, the electric power of the sub-battery 61 is supplied to the priority load 40 through the DC-DC converter 71a. However, the system may be configured to be switched to the mode of supplying the electric power (through the fourth relay R4) with the DC-DC converter 71a being bypassed, depending on the remaining capacity of the sub-battery 61 or the required current values of the auxiliary machine loads. Specifically, as illustrated in FIG. 12A and FIG. 12B, steps S304 to S312 are replaced with steps S803 to S814, and steps S318 to S322 and step S312 subsequent to steps S318 to S322 are replaced with steps S815 to S825. Hereinafter, processing of steps S803 to S814 and steps S815 to S825 will be described.

In step S803, the ECU 74 determines whether or not the remaining capacity (charging state) of the sub-battery 61 drops to a reference value prescribed in advance or below. Specifically, the ECU 74 determines whether or not the voltage V2 of the sub-battery 61 received from the sub-battery module 60 (sensor 62) is equal to or below the predetermined threshold value V2th. When it is determined that the voltage V2 of the sub-battery 61 is not equal to or below the predetermined threshold value V2th, the ECU 74 determines that the remaining capacity of the sub-battery 61 is not equal to or below the reference value prescribed in advance, and advances the processing to step S804. When the voltage V2 of the sub-battery 61 is equal to or below the predetermined threshold value V2th, the ECU 74 determines that the remaining capacity of the sub-battery 61 is equal to or below the reference value prescribed in advance, and advances the processing to step S810.

In step S804, the ECU 74 determines whether or not a required current value of the priority load 40 is equal to or above a reference value prescribed in advance. Specifically, the ECU 74 determines whether or not a change amount (current change amount) ΔI2 (corresponding to current change speed of the sub-battery 61) from a previous value of the current I2 of the sub-battery 61 received from the sub-battery module 60 (the sensor 62) is equal to or above a predetermined threshold value dI2th. When the current change amount ΔI2 of the sub-battery 61 is not equal to or above the predetermined threshold value dI2th, the ECU 74 determines that the required current value of the priority load 40 is not equal to or above the reference value prescribed in advance, and advances the processing to step S805. When the current change amount ΔI2 of the sub-battery 61 is equal to or above the predetermined threshold value dI2th, the ECU 74 determines that the required current value of the priority load 40 is equal to or above the reference value prescribed in advance, and advances the processing to step S810.

The processing of step S805 is the same as the processing of step S304 except that the fourth relay R4 is set in OFF state.

The processing of steps S805 to S809 is the same as the processing of step S304 to S312, except that in steps S805 and 808, setting the fourth relay R4 in OFF state is added to the processing of steps S304 and S310. Accordingly, the description thereof is omitted.

The processing of steps S810 to S814 is the same as the processing of steps S704 to S712 in FIG. 11 described before. Accordingly, the description thereof is omitted.

The processing of steps S815 to S825, and steps S314 and S316 subsequent to steps S815 to S825 is the same as the processing of steps S602 to S626 in FIG. 10 in the fourth embodiment. Accordingly, the description thereof is omitted.

What is claimed is:

1. A power source system, comprising:
   a main-power source;
   a first load connected to the main-power source;
   a second load connected the main-power source, the second load being higher in an actuation priority than the first load;
   a sub-power source connected to the first load and the second load;
   a first detection unit configured to detect output electric power of the main-power source; and
   a switch unit configured to be able to switch whether or not to supply the electric power coming from the sub-power source to the first load, wherein
   a control unit is configured to:
   control the switch unit so that the electric power from the sub-power source is supplied to the first load, when the output electric power of the main-power source is less than the required electric power of the first load and the second load and the electric power supplies from the sub-power source to the second load is more than the electric power supplied form the sub-power source to the first load; and
   control the switch unit so that the electric power form the sub-power is not supplied to the first load, when the output electric power of the main-power source is less than the required electric power of the first load and the second load and the electric power supplied from the sub-power source to the second load is not more than the electric power supplied from the sub-power source to the first load.

2. The power source system according to claim 1, further comprising:
   a regulation unit disposed in a connection line between the sub-power source and the first load and the second load, the regulation unit being configured to regulate the electric power from the sub-power source, the electric power being supplied to a first line connected to the first load and to a second line connected to the second load;
   wherein
   the regulation unit includes a DC-DC converter configured to regulate an output voltage so as to switch whether or not to supply the electric power from the sub-power source to the first line and the second line, and
   the control unit is configured to control the output voltage of the DC-DC converter so that the output voltage of the DC-DC converter falls within a range of a required voltage of the second load, when the output electric power of the main-power source is less than the required electric power of the first load and the second load.

3. The power source system according to claim 1, further comprising:
   a regulation unit disposed in a connection line between the sub-power source and the first load and the second load, the regulation unit being configured to regulate the electric power form the sub-power source, the electric power being supplied to a first line connected to the first load and to a second line connected to the second load; wherein
   the regulation unit includes a relay configured to switch a disconnected state and a connected state so as to switch whether or not to supply the electric power from the sub-power source to the first line and the second line, and the control unit is configured to control the relay to be in a connected state when the output electric power of the main-power source is less than the required electric power of the first load and the second load.

4. The power source system according to claim 1, further comprising:
a regulation unit disposed in a connection line between the sub-power source and the first load and the second load, the regulation unit being configured to regulate the electric power form the sub-power source, the electric power being supplied to a first line connected to the first load and to a second line connected to the second load; and
a second detection unit configured to detect remaining capacity of the sub-power source; and
a third detection unit configured to detect current flowing to the sub-power source, wherein
the regulation unit includes:
a DC-DC converter configured to regulate an output voltage so as to switch whether or not to supply the electric power from the sub-power source to the first line and the second line; and
a relay provided in a bypass route that bypasses the DC-DC converter to connect the first load and the second load to the sub-power source, and
the control unit is configured to:
stop actuation of the DC-DC converter while controlling the relay to be in a connected state, when the output electric power of the main-power source is less than the required electric power of the first load and the second load and the remaining capacity is equal to or below a first threshold or change speed of the current is equal to or above a second threshold; and
control a voltage of the DC-DC converter to fall within a range of a required voltage of the second load while controlling the relay to be in a disconnected state, when the output electric power of the main-power source is less than the required electric power of the first load and the second load and the remaining capacity is not equal to or below the first threshold and the change speed of the current is not equal to or above the second threshold.

5. The power source system according to claim 1, further comprising:
a regulation unit disposed in a connection line between the sub-power source and the first load and the second load, the regulation unit being configured to regulate the electric power from the sub-power source, the electric power being supplied to a first line connected to the first load and to a second line connected to the second load; and a fourth detection unit configured to detect the voltage of the sub-power source, wherein
the regulation unit includes:
a DC-DC converter configured to regulate an output voltage so as to switch whether or not to supply the electric power from the sub-power source to the first line and the second line; and
a relay provided in a bypass route that bypasses the DC-DC converter to connect the first load and the second load to the sub-power source, and
the control unit is configured to stop actuation of the DC-DC converter and controls the relay to be in a connected state when the output electric power of the main-power source is less than the required electric power of the first load and the second load, and then when the voltage of the sub-power source becomes less than a range of a required voltage of the second load, the control unit is configured to control the relay to be in a disconnected state.

6. A power source system, comprising:
a main-power source;
a first load connected in parallel to the main-power source;
a second load connected in parallel to the main-power source, the second load being higher in an actuation priority than the first load;
a sub-power source connected in parallel to the first load and the second load;
a first detection unit configured to detect output electric power of the main-power source;
a control unit configured to supply electric power from the sub-power source more to the second load than to the first load, when the output electric power of the main-power source is less than required electric power of the first load and the second load;
a regulation unit disposed in a connection line between the sub-power source and the first load and the second load, the regulation unit being configured to regulate the electric power from the sub-power source, the electric power being supplied to a first line connected to the first load and to a second line connected to the second load;
a switch unit provided in the first line, the switch unit being configured to be able to switch whether or not to supply the electric power coming from the sub-power source via the regulation unit to the first load, wherein
the control unit is configured to control the regulation unit and the switch unit so that the electric power is supplied from the sub-power source more to the second load than to the first load, when the output electric power of the main-power source is less than the required electric power of the first load and the second load,
a second detection unit configured to detect remaining capacity of the sub-power source; and
a third detection unit configured to detect current flowing to the sub-power source, wherein
the regulation unit includes:
a DC-DC converter configured to regulate an output voltage so as to switch whether or not to supply the electric power from the sub-power source to the first line and the second line; and
a relay provided in a bypass route that bypasses the DC-DC converter to connect the first load and the second load to the sub-power source, and
the control unit is configured to:
stop actuation of the DC-DC converter while controlling the relay to be in a connected state, when the output electric power of the main-power source is less than the required electric power of the first load and the second load and the remaining capacity is equal to or below a first threshold or change speed of the current is equal to or above a second threshold; and
control a voltage of the DC-DC converter to fall within a range of a required voltage of the second load while controlling the relay to be in a disconnected state, when the output electric power of the main-power source is less than the required electric power of the first load and the second load and the remaining capacity is not equal to or below the first threshold and the change speed of the current is not equal to or above the second threshold.

7. A power source system, comprising:
a main-power source;
a first load connected in parallel to the main-power source;
a second load connected in parallel to the main-power source, the second load being higher in an actuation priority than the first load;
a sub-power source connected in parallel to the first load and the second load;
a first detection unit configured to detect output electric power of the main-power source; and
a control unit configured to supply electric power from the sub-power source more to the second load than to the first load, when the output electric power of the main-power source is less than required electric power of the first load and the second load;
a regulation unit disposed in a connection line between the sub-power source and the first load and the second load, the regulation unit being configured to regulate the electric power from the sub-power source, the electric power being supplied to a first line connected to the first load and to a second line connected to the second load;
a switch unit provided in the first line, the switch unit being configured to be able to switch whether or not to supply the electric power coming from the sub-power source via the regulation unit to the first load, wherein
the control unit is configured to control the regulation unit and the switch unit so that the electric power is supplied from the sub-power source more to the second load than to the first load, when the output electric power of the main-power source is less than the required electric power of the first load and the second load;
a second detection unit configured to detect the voltage of the sub-power source, wherein
the regulation unit includes:
a DC-DC converter configured to regulate an output voltage so as to switch whether or not to supply the electric power from the sub-power source to the first line and the second line; and
a relay provided in a bypass route that bypasses the DC-DC converter to connect the first load and the second load to the sub-power source, and
the control unit is configured to stop actuation of the DC-DC converter and controls the relay to be in a connected state when the output electric power of the main-power source is less than the required electric power of the first load and the second load, and then when the voltage of the sub-power source becomes less than a range of a required voltage of the second load, the control unit is configured to control the relay to be in a disconnected state.

* * * * *